US012586738B2

(12) United States Patent
Guziak

(10) Patent No.: US 12,586,738 B2
(45) Date of Patent: Mar. 24, 2026

(54) ELECTRONIC SNUBBER FOR ELIMINATION OF SWITCH CONTACT IMPEDANCE INCREASE AND ARC CONTAMINANT DEPOSITION

(71) Applicant: HYDRA-ELECTRIC COMPANY, Burbank, CA (US)

(72) Inventor: Robert Andrew Guziak, West Mifflin, PA (US)

(73) Assignee: HYDRA-ELECTRIC COMPANY, Burbank, CA (US)

( * ) Notice: Subject to any disclaimer, the term of this patent is extended or adjusted under 35 U.S.C. 154(b) by 253 days.

(21) Appl. No.: 18/240,208

(22) Filed: Aug. 30, 2023

(65) Prior Publication Data

US 2024/0021382 A1 Jan. 18, 2024

Related U.S. Application Data

(63) Continuation-in-part of application No. PCT/US2022/023068, filed on Apr. 1, 2022.

(60) Provisional application No. 63/402,332, filed on Aug. 30, 2022, provisional application No. 63/169,791, filed on Apr. 1, 2021.

(51) Int. Cl.
*H01H 9/34* (2006.01)
*H01H 9/54* (2006.01)

(52) U.S. Cl.
CPC .............. *H01H 9/34* (2013.01); *H01H 9/542* (2013.01)

(58) Field of Classification Search
CPC .......... H01H 9/34; H01H 9/542; H01H 9/541; H01H 9/547; H01H 2009/544; H01H 2009/546; H01H 33/596; H01H 9/302; H01H 9/383; G01R 31/327; G01R 31/3278; G01R 27/205
USPC ............. 218/1; 327/314; 361/102, 101, 91.7
See application file for complete search history.

(56) References Cited

U.S. PATENT DOCUMENTS 3,689,856 A 9/1972 Lambert et al.
5,339,210 A 8/1994 Howell
6,292,075 B1 9/2001 Connell et al.
6,438,002 B2 8/2002 Alhoussami
(Continued)

FOREIGN PATENT DOCUMENTS

DE 4324267 A1 1/1994
EP 0125588 B1 3/1987
GB 1100244 A 1/1968

OTHER PUBLICATIONS

International Search Report and Written Opinion for PCT/US23/31551 mailed Feb. 6, 2024.
(Continued)

*Primary Examiner* — William A Bolton
(74) *Attorney, Agent, or Firm* — Command IP LLP; Michael Zarrabian

(57) ABSTRACT

Systems, devices, and methods for a switch comprising two or more contacts, where the switch is configured to transition between an open state and a closed state; and a circuit comprising a snubber circuit in communication with the switch, where a snubber circuit or energy limiting isolator circuit is configured to eliminate arcing during the transition between the closed state and the open state by limiting voltage that prevents arcing sufficient to trigger a chemical breakdown of a surrounding atmosphere on at least one of the two or more contacts.

25 Claims, 12 Drawing Sheets

(56) References Cited

U.S. PATENT DOCUMENTS

| | | | | |
|---|---|---|---|---|
| 8,325,455 | B2 * | 12/2012 | Divan | H02H 9/042<br>361/118 |
| 8,837,102 | B2 * | 9/2014 | Chin | H02H 9/047<br>361/93.1 |
| 9,847,185 | B2 * | 12/2017 | Henke | H01H 9/54 |
| 10,677,846 | B2 * | 6/2020 | Guziak | H01H 9/542 |
| 2001/0045858 | A1 | 11/2001 | Alhoussami | |
| 2013/0162136 | A1 | 6/2013 | Baldwin et al. | |
| 2014/0313628 | A1 * | 10/2014 | Hafner | H02H 3/22<br>361/91.5 |
| 2017/0112191 | A1 | 4/2017 | Sur et al. | |
| 2017/0139433 | A1 | 5/2017 | Finley | |
| 2018/0172766 | A1 | 6/2018 | Guziak | |
| 2019/0096633 | A1 * | 3/2019 | Pankratz | H01J 37/32935 |
| 2019/0311864 | A1 * | 10/2019 | Wu | H01H 33/596 |
| 2020/0135414 | A1 * | 4/2020 | Morita | H01H 9/54 |
| 2020/0343714 | A1 | 10/2020 | Guziak | |

OTHER PUBLICATIONS

International Search Report and Written Opinion for PCT Application No. PCT/US2022/023068 mailed Jul. 6, 2022.

* cited by examiner

ELECTRONIC SNUBBER FOR ELIMINATION OF SWITCH CONTACT IMPEDANCE INCREASE AND ARC CONTAMINANT DEPOSITION

CROSS-REFERENCE TO RELATED APPLICATION

This application claims the priority benefit of U.S. Provisional Patent Application Ser. No. 63/402,332 filed Aug. 30, 2022, and this application is a continuation-in-part of Patent Cooperation Treaty Application No. PCT/US22/23068 filed Apr. 1, 2022, which claims priority to U.S. Provisional Patent Application Ser. No. 63/169,791 filed Apr. 1, 2021, all of which are incorporated herein by reference in their entireties.

TECHNICAL FIELD

Embodiments relate generally to electronic circuits, and more particularly to a snubber circuit for elimination of switch contact impedance increase.

BACKGROUND

In many switch applications, such as aerospace pressure and temperature indicator switches, proper switch operation is critical. For example, a microswitch impedance increase can lead to microswitch failure. A major cause of microswitch failure due to impedance increase can be attributed to contaminant deposition at contact points of a microswitch during an arcing event. During arcing events, particularly within a microswitch system, burning of contaminants occurs at the arcing points depositing contaminants found in the air or a surface onto a contact point. These deposited contaminants can drastically or critically increase the impedance electrical of a microswitch causing component failure.

SUMMARY

An embodiment of a system and device disclosed herein includes an electrical circuit switch having an electronic snubber that isolates, and eliminates arcing, in a switch during a transition from a closed state to an open state by isolating a microswitch and limiting a voltage which subsequently reduces arcing event occurrences, the contained arcing energy, and the duration of an arc which leads to reduced contamination and either increased lifetime to failure due to contact resistance increase, or limiting the maximum contact impedance increase.

A system embodiment may include: a switch comprising two or more contacts, where the switch may be configured to transition between an open state and a closed state; and a circuit comprising a snubber circuit in communication with the switch, where the snubber circuit may be configured as an energy limiting isolator circuit to reduce arcing during the switch transition between the closed state and the open state by limiting voltage, to prevent arcing that triggers a chemical breakdown of a surrounding atmosphere on at least one of the two or more switch contacts to eliminate increased contact resistance.

In additional system embodiments, the snubber circuit may be further configured to reduce arcing event occurrences, reduce contained arcing energy, and reduce a duration of an arc event. In additional system embodiments, the snubber circuit may be configured to reduce arcing that causes the chemical breakdown of the surrounding atmosphere on the at least one of the two or more contacts that causes a deposition of contaminants on the at least one of the two or more contacts of the switch, which increases contact electrical resistance.

In additional system embodiments, the snubber circuit electrically isolates the switch to maintain a voltage buildup below a threshold, which prevents a high energy discharge across at least one of the two or more switch contacts, where the high energy discharge causes the surrounding atmosphere to form contaminants on a surface of at least one of the two or more contacts. In additional system embodiments, the snubber circuit may be configured to reduce mechanical adhesion properties of a switch contact surface of the two or more contacts through a secondary effect of reducing micro-arc welding surface roughness.

Additional system embodiments may further include: a sense resistor in electrical communication with the snubber circuit; a parasitic element in electrical communication with the sense resistor, where the parasitic element simulates a parasitic inductance and a parasitic capacitance; and a power supply in electrical communication with the parasitic element. In additional system embodiments, the switch comprises bifurcated contacts, where one of the bifurcated contacts may be configured as a sacrificial first contact with a closer spacing to the switch that causes a first arc event to occur before a second arc event at a second contact, thus protecting the further spaced second contact, and thus reducing arcing for the second contact. In additional system embodiments, the bifurcated contacts decrease contact resistance of the switch and allow one or more of the following: extended life in case of welding issues, and physical blockage and wear of gold exposing underlying nickel. In additional system embodiments, the snubber circuit comprises a transistor circuit that limits the electrical signal to the at least one of the two or more contacts while maintaining an impedance that mitigates effects of an arc event in the switch.

In additional system embodiments, the snubber circuit comprises a transistor isolation circuit that separates a main voltage in switching from a sensed impedance through the transistor during switch operation. In additional system embodiments, the snubber circuit includes an electronic switch-off circuit comprising a transistor with a gain greater than about 100 Ohms, an Off impedance about 10 times greater than an On condition of the transistor, and a low On resistance in a range of about 10 to 500 Ohms. In additional system embodiments, the snubber circuit comprises a gain circuit including a transistor and a bias circuitry for a sensing circuit and filtering by circuit capacitance, where the snubber circuit reduces one or more of: arc energy, arc event duration and peak voltage, and current in the switch. In additional system embodiments, the snubber circuit may be configured via the transistor to sense a switch contact closure, and to decrease a switch contact impedance increase based on the gain of the transistor. In additional system embodiments, an arc discharge creates an insulation layer that increases impedance on at least one of the two or more contacts.

Another system embodiment may include: a snubber circuit configured as an electrical energy limiting circuit for electrical connection with an electrical switch, where the snubber circuit may be configured to reduce electrical arcing in the switch during the transition between a closed state and an open state of the contacts.

In additional system embodiments, the snubber circuit may be configured to limit a maximum voltage signal to at least one contact of the switch. In additional system embodiments, the snubber circuit comprises a clamping circuit to clamp voltage spikes to the electrical switch. In additional system embodiments, the snubber circuit comprises an attenuation circuit configured to limit electrical current to the electrical switch. In additional system embodiments, the snubber circuit comprises a gain circuit configured to limit the electrical signal to the switch. In additional system embodiments, the snubber circuit comprises a gain circuit configured to maintain a switch impedance that mitigates effects of switch contact degradation to external circuits.

Additional system embodiments may further include: a switch in electrical communication with the snubber circuit, where the switch comprises two or more contacts configured to transition between an open state of the contacts and a closed state of the contacts, where in the closed state the switch conducts electrical signals through the contacts.

A method embodiment may include: limiting arc energy, arc event occurrences, and arc event duration in a snubber circuit system comprising a switch via a snubber circuit in communication with the switch, where the snubber circuit may be configured to electrically isolate the switch and prevent at least one of: a chemical breakdown with a burning that causes contact impedance increases due to organic atmospheres; an arc induced burning of contaminants in atmospheres surrounding the switch, which deposit contaminants on at least one of two or more contacts of switch; and a reduction of the duration of the chemical breakdown of the atmosphere surrounding the switch.

Another method embodiment may include: transitioning a switch between an open state and a closed state, where the switch comprises two or more contacts; and dissipating stored energy via a snubber circuit in communication with the switch, where the snubber circuit may be configured to eliminate arcing during the transition between the closed state and the open state by limiting voltage that prevents arcing sufficient to trigger a chemical breakdown of a surrounding atmosphere on at least one of the two or more contacts. In additional method embodiments, dissipating the stored energy further comprises one or more of: limiting voltage signal transients and limiting current signal transients. Additional method embodiments may further include: determining maximum voltage allowed by the snubber by at least one of chemical analysis, testing and atmospheric variations.

BRIEF DESCRIPTION OF THE DRAWINGS

The components in the figures are not necessarily to scale, emphasis instead being placed upon illustrating the principals of the invention. Like reference numerals designate corresponding parts throughout the different views. Embodiments are illustrated by way of example and not limitation in the figures of the accompanying drawings, in which.

DETAILED DESCRIPTION

Figure 1A:
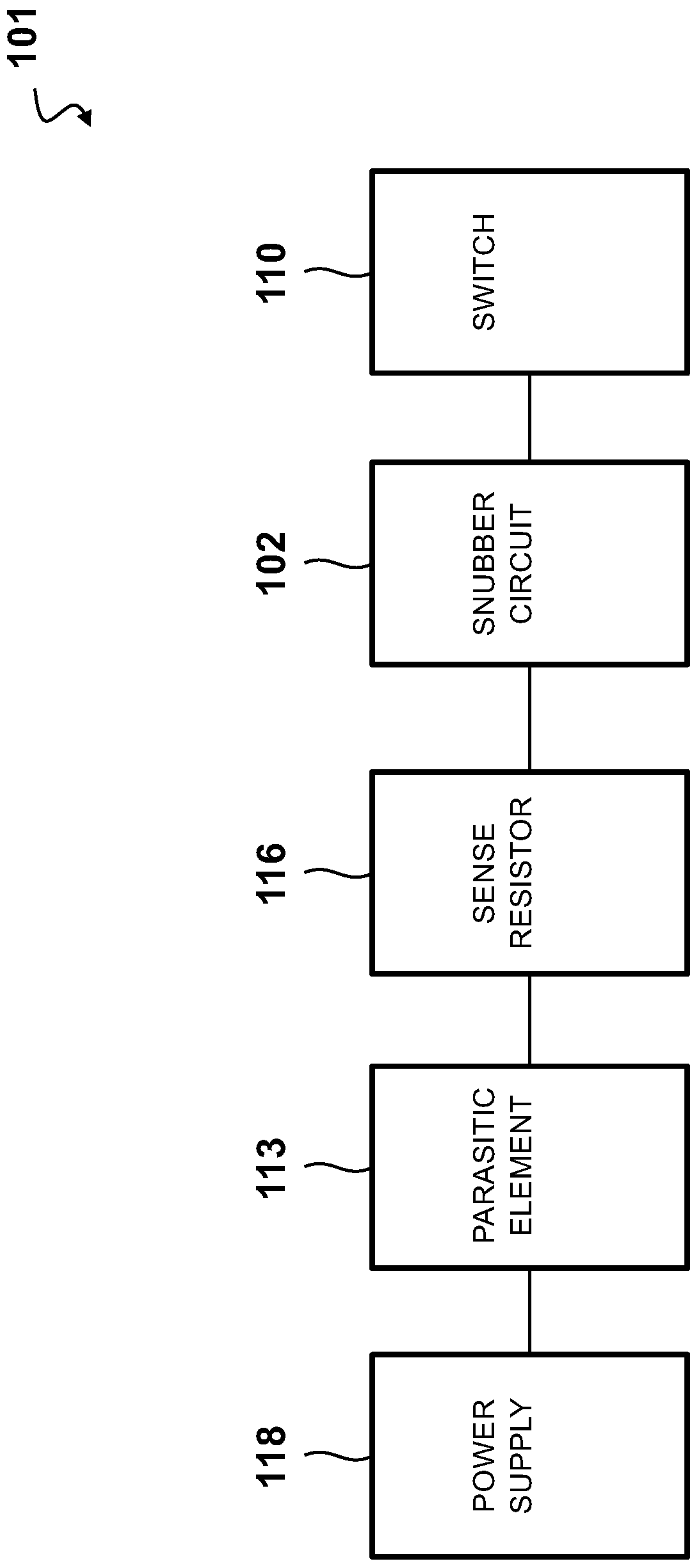
FIG. 1A depicts a high-level block diagram of a system including a snubber circuit, according to one embodiment.

The following description is made for the purpose of illustrating the general principles of the embodiments disclosed herein and is not meant to limit the concepts disclosed herein. Further, particular features described herein can be used in combination with other described features in each of the various possible combinations and permutations. Unless otherwise specifically defined herein, all terms are to be given their broadest possible interpretation including meanings implied from the description as well as meanings understood by those skilled in the art and/or as defined in dictionaries, treatises, etc.

In one embodiment, an electronic circuit disclosed herein prevents degradation in the contact resistance of electrical switches such as microswitches. Such degradation can be caused by deposition of contaminants induced by electrical arcing. Such switches may be used to indicate the state of a physical parameter, such as pressure or temperature, in applications such as aerospace measurement switches. In one embodiment disclosed herein, an electrical switch is essentially electrically isolated from voltage and/or current spikes, and voltage across the switch is controlled to reduce electrical arcing, reduce contained electrical arcing energy, and reduce the duration of an electrical arcing event between the electrical contacts of the switches. Such reductions lower switch contact contamination and reduce impedance increase in the switch contacts. Such reductions further increase the lifetime of the switch and lower failure due to contact resistance increase. Such reductions further cap and/or limit the maximum contact impedance increase.

Embodiments disclose an attenuation circuit and process that suppresses the phenomenon of voltage transients in electrical systems. One embodiment comprises an attenuation circuit (electronic "snubber" circuit) for electrical switches. The disclosed snubber circuit reduces electrical arcing which occurs when an electrical current jumps a gap in a circuit or between two electrodes such as switch contacts. The snubber circuit essentially electrically isolates a switch from voltage and/or current spikes, and limits (contains) energy across contact points of the switch, reduces the duration of an arcing event thereby eliminating contact impedance increase, and increasing switch lifetime. As used herein, in one example, electrically isolating the switch 110 includes the snubber circuit 102 limiting voltage and/or current levels (e.g., amplitudes, peaks) across the switch 110 which may cause electrical arcing or high energy discharge in the switch when the switch contacts transition between open and closed states.

In one embodiment, the snubber circuit and process disclosed herein may offer further improvements to limit the maximum voltage of electrical arcing between contacts in an electrical device as the switch opens or closes. Uncontrolled arcing may induce burning or chemical breakdown of contaminants in the atmosphere surrounding a switch such as microswitch. These contaminants are deposited at the site of the arcing, which may be on the switch contacts. As this arc-induced coating of the contact site increases, such as in a repeated open and close (or "make and break") action in an electrical switch, the contaminant builds up an insulating layer on the contacts. This insulating layer may cause the contact to increase in contact resistance (increased impedance). Example values for contact resistance initially may start at about 100 milliohms and increase to hundreds or thousands of ohms.

A system embodiment may include: a switch with an electronic snubber with the capability of eliminating arcing in a microswitch during a transition from a closed state to an open state by limiting voltage to prevent arcing sufficient to trigger a chemical breakdown of a surrounding atmosphere which can lead to the deposition of contaminants which increase contact resistance.

Another system embodiment may include: an energy limiting circuit isolating a microswitch where a voltage value across the microswitch is controlled preventing arcing sufficient to trigger a chemical breakdown of a surrounding atmosphere.

Another system embodiment may include: a snubber circuit isolating a microswitch where a voltage is controlled to minimize a duration of an arc event reducing contamination induced by the burning of contaminants in the atmosphere surrounding the microswitch. A system embodiment may include: a switch comprising two or more contacts, where the switch may be configured to transition between an open state and a closed state; and a circuit comprising a snubber circuit in communication with the switch, where the snubber circuit may be configured to electrically limit or isolate the switch controlling the voltage supplied to the switch to eliminate arcing and the deposition of contaminants during the transition between the closed state and the open state and preventing arcing sufficient to trigger a chemical breakdown of a surrounding atmosphere on at least one of the two or more contacts.

In additional system embodiments, the chemical breakdown of the surrounding atmosphere on the at least one of the two or more contacts leads to an increased contact resistance of the switch where contaminants in the atmosphere surrounding the switch are burned onto at least one of the two or more contact leads. In additional system embodiments, the snubber circuit isolating the switch maintains a voltage buildup below a threshold that causes a high energy discharge across an opening switch contact of the two or more contacts that causes the surrounding atmosphere to form solid contaminants on a surface of at least one of the two or more contacts. In additional system embodiments, the snubber circuit may be configured to reduce mechanical adhesion properties of a contact surface of the two or more contacts through a secondary effect of reducing micro-arc welding surface roughness. In additional system embodiments, the snubber circuit by controlling a voltage buildup below a threshold, controls a duration of the arc leads further controlling a high energy discharge across an opening switch contact of the two or more contacts that causes the surrounding atmosphere to form solid contaminants on a surface of at least one of the two or more contacts. When atmospheric transported material either in vapor form, gas form or fine particles burn in an arc, the chemical composition of the residue often contains carbon and carbon compounds that form a solid that covers the surface.

An alternate system embodiment may include: a switch comprising two or more contacts; and a snubber circuit in electrical communication with the switch, where the snubber circuit may be configured to electrically isolate the switch eliminating arcing during a transition of the switch between a closed state and an open state by limiting voltage that prevents arcing sufficient to trigger a chemical breakdown of a surrounding atmosphere on at least one contact of the two or more contacts increasing a lifetime to failure due to contact resistance increase. In additional system embodiments, the snubber circuit is in electrical communication with the switch, where the snubber circuit may be configured to electrically isolate the switch, which limits the maximum contact impedance increase by limiting the voltage that prevents arcing sufficient to trigger a chemical breakdown of a surrounding atmosphere on at least one contact of the two or more contacts.

Additional system embodiments may further include: a sense resistor in electrical communication with the snubber circuit; a parasitic element in electrical communication with the sense resistor; and a power supply in electrical communication with the parasitic element. In additional system embodiments, the parasitic element simulates (electrically represents) a parasitic inductance and a parasitic capacitance seen in a wire. In additional system embodiments, the parasitic element presents a transient voltage spike in a simulation that represents an arc that would cause the chemical breakdown of the surrounding atmosphere on at least one of the two or more contacts which may induce burning of contaminants in the atmosphere surrounding the switch. In additional system embodiments, the parasitic element includes: a parasitic inductance, where the parasitic inductance may be connected in series with the power supply; and a parasitic capacitance, where the parasitic inductance may be connected in parallel across the parasitic capacitance.

A method embodiment may include: limiting arc energy and occurrence in a circuit comprising a switch via a snubber circuit in communication with the switch, where the snubber circuit may be configured to electrically isolate the switch and prevent at least one of: a chemical breakdown, a burning that leads to contact impedance increases due to organic atmospheres, an induced burning of contaminants in the atmosphere surrounding the switch, and a deposit of contaminants at the contact points where the arcing occurs.

An embodiment of a snubber circuit disclosed herein may be used to clamp voltages across a switch for the purpose of eliminating and/or reducing the welding of gold between gold switch contacts. The embodiment of the snubber circuit disclosed herein may also essentially eliminate contaminant build up on the switch contacts due to arcing. In one embodiment, a system may comprise a mechanical or electronically enhanced mechanical switch comprising two or more contacts, wherein the switch may be configured to transition between an open state and a closed state. The system may further comprise an electrical energy limiting isolator circuit comprising a snubber circuit configured to reduce or eliminate arcing during the transition between the switch closed state and the open state, by limiting voltage and/or current to prevent electrical arcing in the switch that may trigger a chemical breakdown of a surrounding atmosphere on at least one of the two or more contacts, thereby eliminating increased contact resistance. In one embodiment, maximum voltage and/or current allowed by the snubber circuit to reach the switch may be determined by at least one of chemical analysis, testing, and atmospheric variation.

Referring to FIG. 1A through FIG. 3, example embodiments are shown. The values shown in the figures and described herein are for example only. Different values are possible and contemplated. FIG. 1A depicts a high-level block diagram of an electrical circuit system 101 including a snubber circuit 102, according to one embodiment disclosed herein. The circuit system 101 may further include a power supply 118, a parasitic element 113, a sense resistor 116, and an electrical switch 110 (e.g., microswitch). The power supply 118 may comprise a standard power supply such as in aircraft applications. In some embodiments, the power supply 118 may comprise, for example, a 28 Volt power supply. The parasitic element 113 and sense resistor 116 may simulate (electrically represent) wiring connections and power sense circuits to provide a transient characteristic. The parasitic element 113 may simulate the parasitic inductance and parasitic capacitance seen in a wire or wire harness of a setup. The values for the parasitic element 113 may change based on wire length and/or a physical construction of the installation. The values for the parasitic element 113 may present a transient voltage spike in a simulation that would represent an electrical arc that would cause burning or chemical breakdown of atmospheric organic compounds on contacts of the switch 110. The parasitic element 113 simulates voltage and/or current conditions that cause arcing and is included in the circuit 100 for demonstrating of the functionality of the snubber circuit 102 in preventing arcing and is not a necessary component for the snubber circuit operation. The sense resistor 116, power supply 118 and parasitic effects element 113 are external to the snubber circuit 102 and circuits of the switch detection circuit. The parasitic element 113 comprises parasitic elements formed by the interconnects, typically wiring, connectors and terminal posts incorporated by the interconnect to an external system. The external system often includes a power source, which can be a battery or power supply, the wiring, and the interconnect components of the system being monitored. The value for the parasitic elements may present transients in the form of inductive kick-back as the current flow through the parasitic inductance causes a high voltage spike.

Such transient voltage spikes may cause burning of contaminants in the atmosphere surrounding the switch 110. When atmospheric transported material either in vapor form, gas form or fine particles burn in an arc, the chemical composition of the residue often contains carbon and carbon compounds that form a solid that covers the surface of switch contacts.

The sense resistor 116 (i.e., Rsense) may comprise a sense resistor or load where a voltage drop across the sense resistor 116 for the open or closed positions (states) of the switch 110 may be sensed. The switch 110 may be operated to determine some system states. In some embodiments, the system state of the switch 110 may be a temperature or pressure detection system set point. In some embodiments, the switch 110 may comprise a Single Pole Double Throw (SPDT) switch. Other switch types are possible and contemplated.

Figure 1B:
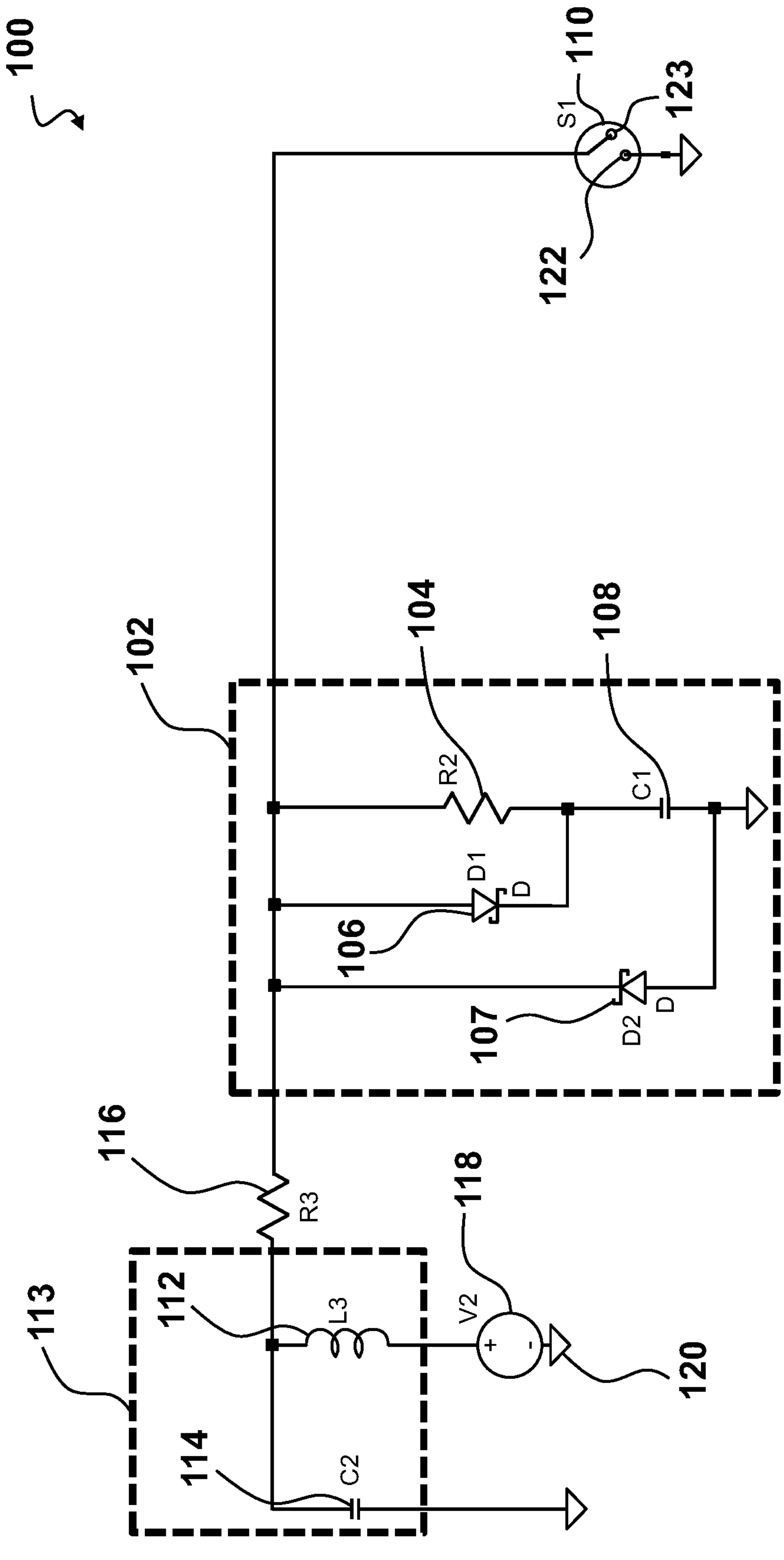
FIG. 1B depicts a circuit diagram of a system, according to one embodiment.

The example circuit 100 in FIG. 1B, illustrates an example implementation of the parasitic element 113, the sense resistor 116, the snubber circuit 102 and the switch 110 of FIG. 1A. The power supply 118, the parasitic element 113 and the sense resistor 116 are external to the snubber circuit disclosed herein according to embodiments of the invention. Referring to the electrical circuit 100 in FIG. 1B in conjunction with FIG. 1A, according to one embodiment the snubber circuit 102 reduces the contact resistance and arc induced contaminant deposition of the switch 110. The switch 110 comprises two or more switch contacts 122, 123, where the switch 110 is configured to transition between an open position and a closed position. The snubber circuit 102 is connected in series between the parasitic element 113 and the switch 110. The snubber circuit 102 is configured to electrically isolate the switch 110 from voltage/current spikes that may cause electrical arcing in the switch during the transition between open and closed positions of the switch, by limiting voltage across the switch contacts.

In one embodiment, for example, the snubber circuit 102 comprises a diode 106 (D1) connected in parallel with the resistor 104 (R2), which are connected in series with a capacitor 108 (C1). The combination is connected in parallel with a diode 107 (D2). In one embodiment, the, parasitic element 113 comprises a parasitic capacitor 114 (C2) connected in parallel with parasitic inductance 112 (L3). In one embodiment, the diodes 106, 107, such as Schottky diodes, may be a semiconductor diode formed by the junction of a semiconductor with a metal. In one embodiment, the second diode 107 is provided to clamp any negative voltage excursions in a ringing system. In one embodiment, the first diode 106 is the clamping diode previously described to limit peak voltage to low values about 0.25 typical for a Schottky diode.

In one embodiment, the parasitic inductance 112 is electrically connected in series with the power supply 118. The sense resistor 116 is connected in series with the switch 110 via the snubber circuit 102. In some embodiments, the parasitic inductance 112 may have a value of about 300 microhenry. In some embodiments, the parasitic capacitor 114 may have a value of about 0.1 picofarad. In some embodiments, the sense resistor 116 may have a value of about three-thousand Ohms. In some embodiments, the resistor 104 may have a resistance of 260 Ohms. In some embodiments, the capacitor 108 may have a value of about 0.01 uF.

In some embodiments, the parasitic inductance 112, a parasitic capacitor 114, a sense resistor 116, and a power supply 118 are configured to simulate the wiring connections and power sense circuits to provide a typical transient characteristic. The parasitic inductance 112 and the parasitic capacitor 114 may form a parasitic element 113.

According to one embodiment, the polarity of each of the diodes 106, 107 in the snubber circuit 102 is selected to snub (attenuate) a ringing signal. Ringing is oscillation of a signal, particularly in a step response such as response to a sudden change in input. The values of the circuit elements 104, 106, 107, 108 in the snubber circuit 102 in combination are determined for suppressing arcing energy that causes chemical breakdown or ignition (arcing).

The parasitic inductance 112 and the parasitic capacitor 114 that form the parasitic element 113 simulate the parasitic inductance and parasitic capacitance seen in a wire or wire harness of a setup. The values of the parasitic inductance 112 and the parasitic capacitor 114 may change between wire length and physical construction of the installation. The values of the parasitic inductance 112 and the parasitic capacitor 114 may be selected to prevent a transient voltage spike in a simulation that would represent an arcing event causing burning or chemical breakdown of atmospheric organic compounds on contacts 122, 123 of the switch 110. The sense resistor 116 may comprise a sense resistor or load where a voltage drop across the sense resistor 116 for the switch 110 open condition or closed condition may be sensed.

The switch 110 is the switch to be operated in determining some system state, such as a temperature or pressure detection system set point. As noted in one example, the switch 110 may comprise a SPDT switch including a normally closed contact 123 and a normally open contact 122. When the switch 110 is normally closed, the snubber circuit 102 may reach a steady state zero state, wherein the capacitor 108 discharges through the resistor 104 to zero volts.

When the switch 110 transitions to the normally open (NO) position, the normally closed (NC) contact 123 opens to high impedance. On opening, the energy stored in the system wiring of parasitic inductance 112 starts to build up a voltage spike. The combination of energy in parasitic inductance 112 and the parasitic capacitor 114 oscillates with a sine wave to a high voltage peak. Any negative going transient voltage is clamped by the second diode 107, which may be a Schottky diode. Electric current may be limited by the series sense resistor 116 and the energy may be dissipated via the sense resistor 116 and the second diode 107.

Positive going voltage spikes may pass through the first diode 106 and resistor 104 into the capacitor 108. The capacitor 108 may act as a short circuit to the transient voltage with an exponentially increasing value determined by the time constant of the sense resistor 116 and the capacitor 108. The circuit element values may be selected so that the predominant effect is for the voltage to be clamped by the first diode 106. The values for capacitance of the capacitor 108 and the resistance of the sense resistor 116 limiting transient voltage to a threshold to reduce risk of electrical arcing across the open contact 123 of the switch 110. The voltage threshold may be selected to reduce and/or limit burning and chemical breakdown due to arcing and prevent deposition of the carbon residue on the open contact 123 of the switch 110.

The resistance value of the resistor 104 may be selected to allow an electrical current of sufficient magnitude to break through and/or burn away any residual carbon contaminant on switch contacts when the switch 110 is closed again. In one example, when the switch 110 is open for a duration greater than approximately five times the RC time-constant of the capacitor 108 and resistor 104, the capacitor 108 voltage will be that of the 28 Volt power supply 118. Selecting the resistor 104 to achieve a current for burning said contaminants may eliminate any residual carbon that is deposited on the contacts 122, 123 of the switch 110.

In another embodiment, the resistance value of the resistor 104 may be selected to prevent any contact resistance heating and ensure that carbon arcing does not burn or break down atmospheric organics. The value of the resistor 104 may be selected to allow a small current during closure of the switch 110 to prevent any current heating of gold-to-gold electrode contact resistance.

In one embodiment, in a measurement system 101 (FIG. 1A) the switch 110 comprises an electromechanical sensing device such as microswitch which may include an actuating plunger that travels a short distance to trigger a contact sequence. As electrical current flows from the power supply 118 (e.g., a 28 Volt supply in an aircraft), the switch 110 may respond to a measured parameter, such as a spring pushing against a diaphragm in contact with a pressure media (e.g., hydraulic fluid). As the media pressure increases or decreases, a moveable structure contacts the spring-loaded switch. When the mechanical pressure passes a threshold, the switch 110 may be activated to change states (e.g., open or close).

In one embodiment, the topology (electrical connections) electrical characteristics of the circuit elements including the resistor 104, the capacitor 108, and the diodes 106, 107 of the snubber circuit 102 may be selected based on a typical rate of change of the voltage spike and said mechanical movement characteristics which may be in the microsecond range for arc event generation. Generally, outgassed materials found in the manufacture of contact switches have shown that contact switches contain organic compounds from potting, PCB materials, adhesives, plastics, resins, wire insulation, solder flux residue, machine cutting oil, and trapped water. These materials break down under arcing with voltages as low as 0.5 volts.

In addition, with some contact materials such as Rhodium, Platinum and Palladium, such materials may form polymers under only the energy of contact rubbing, so-called "contact polymerization." This contact polymerization may occur due to an amount of energy generated by effects such as arcing at the 0.5 Volt level.

According to one embodiment, given this understanding of the arc generating voltage activation, the mechanical movement speed, and the rate of change of typical arc waveforms, values for the components (e.g., the resistance 104, the capacitance 108, and the diodes 106, 107 of the snubber circuit 102) may be selected to prevent voltage build up over time to reduce/eliminate breakdown of the atmosphere and arc generation in the switch 110. In one embodiment, the voltage required to cause outgassing breakdown due to arcing and generation of an insulating layer over the switch gold contacts may be prevented with low voltage diodes such as diodes 106, 107 and the RC time constant values for capacitor 108 and resistor 104. For example, RC time constant values may be in a 100-ohm to 1,000-ohm range for resistance 104 and a 0.001 uF to 0.1 uF range for capacitance 108.

In one example operation, without the snubber circuit 102, a closed contact of the switch 110 is created by the state of a measured quantity such as a measured pressure by hardware (not shown). The closed contact causes current to flow from the 28 Volt power supply 118, through the switch 110 contacts 122, 123. Sensing the voltage between a power return 120 and the sense resistor 116 will indicate a low voltage for the correct operating condition. This low voltage represents the voltage drop across the impedance of the switch 110, which maybe on the order of 100 milliohms. This impedance causes the sense voltage to be approximately zero volts. When the physical parameter being measured (e.g., fluid pressure) causes the switch 110 to change to an open position, the impedance nears infinite. This infinite impedance will cause a sense point of the sense resistor 116 to drop to about zero current and indicate the full 28 Volts at the switch. With the snubber circuit 102, such voltage that causes arcing is eliminated.

In additional system embodiments, the snubber circuit 102 is configured to limit the maximum contact impedance and limit the contact resistance increase on at least one of the two or more switch contacts caused by the deposition of contaminants induced by an arcing event. In additional system embodiments, the chemical breakdown of the surrounding atmosphere on the at least one of the two or more switch contacts can lead to an increased contact resistance of the switch 110 where said chemical breakdown burns contaminants surrounding the electrical leads to the switch, depositing them on surfaces of the at least one of the two or more switch contacts. In additional system embodiments, the snubber circuit 102 detects a voltage drop to sense the closed or open position of the switch 110, reducing impedance increase of the contacts 122, 123 using the gain of the transistor 106.

In another embodiment, the disclosed snubber circuit 102 is configured to limit the maximum voltage generated from an inductive transient as the flow of current is interrupted by opening the switch 110. For example, the snubber circuit 102 may include configurations which may include a low threshold transistor or voltage mirroring circuits, which may generate opposite polarity voltage to an arcing voltage and reducing arcing.

The gain of the transistor provides the dual function of reducing the switch contact impedance by the factor of gain to the outside sense circuitry, while also limiting the energy (voltage and current) imposed to the switch.

A method embodiment may include: limiting arc energy and occurrence in a switch 110 via a snubber circuit 102 in communication with the switch 110, where the snubber circuit 102 is configured to prevent at least one of: an arc induced burning of contaminants in the atmosphere surrounding the switch 110 which deposit contaminants on at least one of the two or more contacts (122, 123) of the switch 110, which contain energy delivered to the switch 110, and reduce a duration of a chemical breakdown of the atmosphere surrounding the switch 110.

The effect of the increased contact resistance due to a build-up of deposited contaminants on at least one of the two or more contacts 122, 123 of the switch 110 is to degrade the ability to differentiate between a closed contact and an open contact in the switch 110.

Arc events in microswitches occur in processes such as Cathodic Arc Deposition (CAD) where the formation of macroparticles (MPs), of sizes ranging between 0.1 and 10 microns are deposited on surfaces of interest in films. MPs increase the surface roughness, create micro holes in superficial coatings, and cause alterations of the microstructure and texture of surfaces. Micro welding, vaporization, and contact wear are factors in a switch life, and are limited also by the snubber and transistor isolation. The major cause and the much-missed phenomenon that causes the bulk of the failure as disclosed herein is contamination deposition of atmospheric carried organics.

In-depth investigation into the origins or microparticles report origins including dust contamination, which may become attached to an electrode surface by Van der Waals forces during assembly processes. Elements such as C, N, O, Si and Ca, originating as dust may also cause the breakdown of an electrode gap. Other microparticle sources include thermal instabilities, especially splashing from electrode erosion by high current arc in gas switches or contacts within a switch providing a gaseous gap traversable by a current under conditions where the inductance is low enough or a voltage is high enough for a current to bridge the gap. Under these circumstances, electrode material could be melted by a high heat flux, where a local material liquid pool takes shape and liquid droplets could splash. Droplets may interact with the arc column and could finally vaporize. Other droplets splashed from an electrode erosion pool may deposit as solid microparticles on the electrode surface. These deposited particles could lead to the production of thousands of microparticles in the triggered electrical arc event and finally solidify on the electrode surface after the arc quenches.

In one example, the open or closed position of a microswitch such as switch 110 may be used to indicate a critical or key parameter in a typical application, such as when used in a pressure sensing switch or a temperature sensing switch. Loss of this capability of differentiating the open or closed position (state) of a microswitch may prevent the determination of the state of the physical parameter being measured. These physical parameters being measured may include: a proper fuel level, the oil pressure, an overheating of an engine, and similar uses.

In one example, switch failures are known to occur in certain situations and applications and are especially critical in applications such as aerospace pressure and temperature indicator switches. The reported environment these failed switches operated in has common characteristics. Switches that show high contact resistance failure were seen to have operated in aerospace applications with higher temperature (e.g., 70 degrees Celsius or above), high mechanical vibration (e.g., >10 G) and a continuously supplied voltage. A mechanism induced by this vibration is making and breaking the electrical connection of the switch contacts. The built-up resistance is due to arc jumping. Arcs produce sufficient energy and heat to "burn" organic compounds found in the surrounding atmosphere. These contaminants are then deposited on the contacts where the burning occurs. Even in an inert atmosphere such as Argon or Nitrogen, outgassing organics mix in the atmosphere and are subject to this arc burning. Noble gas backfill may be used such as Argon, but an outgassing contaminant from plastics, polymers, potting etc., can still enter the atmosphere and can be deposited during an arc, even where oxygen is in low quantity.

In one example, the insulation layer formed on switch contacts due to arcing is found to be on the gold interface of the electron-to-electron contact is carbon based. To eliminate physical contact pressure as a cause of trapping contaminants, the disclosed snubber circuit is configured to limit arcing energy. Without the disclosed snubber circuit, arcing events over cycles of opening and closing the switch 110 induced contaminant build up on switch contacts and high impedance.

Embodiments of the snubber circuit disclosed herein may reduce the amount of voltage required across the contacts and allow for a higher initial contact resistance. In one example, a circuit may sense contact impedance and divide by the gain of an amplifier. In one example, this circuit maintains a constant lower impedance even in the case of a microswitch increasing its contact resistance.

Figure 1C:
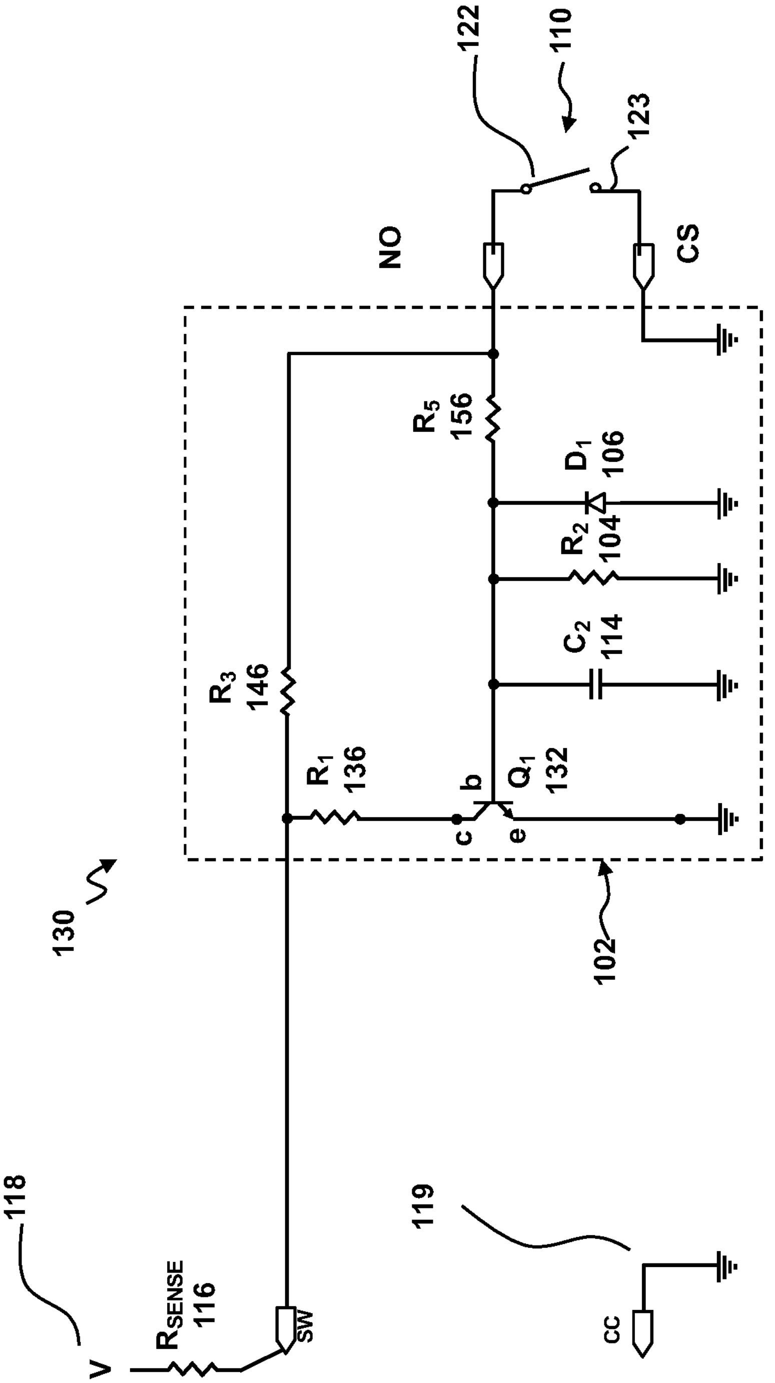
FIG. 1C depicts a circuit diagram of an isolation and energy limiting system including snubber circuit, according to another embodiment.

FIG. 1C illustrates an isolation and energy limiting circuit system 130, according to another embodiment. The system 130 includes another embodiment of the snubber circuit 102 for the switch 110. The implementation is one possible circuit of many that can be implemented to perform the function of the snubber circuit 102. In this embodiment, the snubber circuit 102 includes an electronic component 132 with a current gain to sense the contact state (i.e., open or closed) of the switch 110. Using the gain, a high impedance mechanical contact 122, 123 of the switch 110 can be made to appear to an external circuit as a low or constant impedance, essentially independent of contact wear in the switch 110. The parasitic element in FIG. 1C is external to the snubber circuit disclosed herein according to embodiments of the invention. The power supply 118, the parasitic element 113 and the sense resistor 116 are shown for demonstrating example operation of the snubber circuit 102 when connected to an external system.

In one embodiment, the snubber circuit 102 includes an electronic circuit (electronic switch-off circuit) comprising a transistor 132 with high gain (e.g., greater than about 100 Ohms), high Off impedance (e.g., about 10 times greater than an On position of the transistor), and low On resistance (e.g., typically about 10 to 500 Ohms). As will be further discussed herein, selection of the transistor gain, bias circuitry for the sensing circuit and filtering by circuit capacitance can reduce the arc energy, duration, and peak voltage, and current. The reduction either provides elimination of the contact impedance increase, increased lifetime to failure due to contact resistance increase, or capping, or limiting, the maximum contact impedance increase.

In one implementation, the electronic switch-off circuit includes a transistor 132 (e.g., bipolar transistor Q1 type BC847CTP) and resistor 136 (R1), where the resistor 136 is connected in series with collector c of the transistor 132. In another embodiment of the electronic switch-off circuit, the transistor 132 may comprise a high reliability, no wear out electronic switch. The electronic device may also include a comparator, operational amplifier, etc. In the embodiment shown in FIG. 1C, the transistor 132 provides a constant, low impedance between external resistance 116 (Rsense) and a power return 119 (e.g., between CC and SW terminals in FIG. 1C). The resistor 136 provides a minimum resistance when the transistor is turned on. This resistor 136 provides an On resistance to indicate a closed position of the switch 110 position to the external circuits. The resistor 136 further provides a voltage level sufficient to drive the components such as the transistor 132, wherein resistor 146 (R3), resistor 156 (R5) and resistor 104 (R2) develop bias for the transistor 132 to turn On. In this case, the transistor 132 is shown as an NPN which requires a voltage of approximately 0.7 volts to turn on. Other types of transistors can turn on with lower voltages approaching 0 volts. The Rsense resistor 116 is commonly external to the switch and is used to indicate an open or closed state of the switch 110. When the transistor is turned on, maximum current flows through Rsense resistor 116 and provides a voltage drop to a lower indicating voltage. This voltage is the same voltage that is dropped over the R1 resistor 136, when measured with respect to the power return 119. Terminal CC indicates the common return of the power supply. Terminal SW indicates the switch input if Rsense resistor 116 is external, or the voltage indicating point if Rsense resistor 116 is included in the switch. In this embodiment, the snubber circuit 102 is electrically connected across the switch 110 (e.g., between power supply 118 and power return 119 such as ground).

In the implementation the snubber circuit 102 shown in FIG. 1C, the base terminal b of the transistor 132 is biased, via a voltage supplied, to sense the state of the switch 110 contact impedance to appear as an Off condition with the switch 110 open, and an On condition with the switch 110 closed. The On condition is when the switch 110 is closed, and the Off condition is when the switch 110 is open. As such, the circuit inverts wherein in one example, when a mechanical switch 110 is closed, the transistor 132 is turned off and indicates to the sense resistor circuit an open switch position. When the mechanical microswitch 110 is open, the transistor 132 is On indicating to the sense circuit a closed switch condition. Additional circuits such as a second transistor can be added to further invert the signals so to reflect the mechanical switch position logic.

Generally, a transistor device conducts current across the collector c to emitter e path, only when a voltage is applied to the base b (i.e., transistor device is On). When no base voltage is present, the transistor device functions as a switch that is Off. When base voltage is present, the transistor device functions as a switch that is On. In another example, a transistor device conducts current across the collector c to emitter e path, only when a voltage above a threshold is applied to the base b (i.e., transistor device is On). When the base voltage is less than the threshold, the transistor device functions as a switch that is Off. When the base voltage is above the threshold, the transistor device functions as a switch that is On.

When the switch 110 is closed, the voltage at the base terminal b of the transistor 132 is taken below a turn-on threshold voltage, causing the transistor 132 to turn off, where the transistor 132 does not conduct current across the collector-emitter path. When switch 110 is opened, the voltage passed to the base b of the transistor 132 is a high voltage as biased by the resistors 146, 156 and 104. When the voltage exceeds approximately 0.7 volts, the transistor 132 turns on. The resistor 136 provides sufficient voltage drop to the current flow through the transistor 132 to maintain the 0.7 Volt bias to the transistor.

As such, the On or Off state of the transistor 132 in relation to the sensed contact impedance of the switch 110, appears to an external circuit as a closed state or open state of the switch 110, respectively. In one example, an Off state of the transistor 132 corresponds to the closed state of the switch 110, and an On state of the transistor 132 corresponds to the open state of the switch 110, essentially independent of the contact wear, galling, fretting, contact welding, and/or contact contamination, in the switch 110.

Other logical conditions may be configured. For example, the snubber circuit 102 may be coupled in the normally open or the normally closed state to reverse the switch sense logic. Further, the s connection of the switch 100 may be from the NO terminal, replacing R3. This reverses the operational logic of the snubber circuit 102 to On with switch 110 closure, and Off with switch 110 open.

In one example, in normally open position of the switch 110, external voltage/power supply 118 (V) of about 28 Volts through Rsense resistor 116 causes voltage at the base b of transistor 132 to be pulled high to cause 0.7 Volt drop across transistor 132 (collector of transistor 132 is at about 0.2 Volts). This causes the transistor 132 to turn On, whereby current flows through the collector-emitter path of the transistor 132. This causes the voltage across Rsense 116 to be high (e.g., about 24 Volts) and the voltage from SW to CC to be about 4 Volts or less.

In one example, when the switch 110 is closed, the voltage at the base b of the transistor 132 is about 0 Volts which turns the transistor 132 Off, and there is open circuit voltage across the transistor 132. The voltage drop across the resistor 146 is a high voltage determined by the resistor divider formed by resistor 146 and Rsense resistor 116, typically about 8 Volts or higher. The voltage from SW to CC is typically about 8 Volts or higher.

As such, in one example the sensed voltage between SW to CC is low (e.g., typically 4 Volts) or lower when the switch 110 is open (transistor 132 is On), and high (e.g., greater than about 8 Volts) when the switch 110 is closed (transistor 132 is Off).

The snubber circuit 102 senses the voltage across the switch 110 and generates a corresponding voltage at the Rsense resistor 116 which is controlled by the switch 110 being open (On) and closed (Off). This allows tailoring the snubber circuit 102 for a switch 110 that has a high impedance (high contact resistance) and normally indicates a false open state for the switch 110. Coupling the snubber circuit 102 between the switch 110 and the external Rsense resistor 116, eliminates the effects of the false open state of the switch 110 on the external Rsense resistor 116 by a gain factor of the transistor 132.

In FIG. 1C, in one example the value of Rsense resistor 116 ($R_{SENSE}$) is about 100K Ohms and the value of the voltage V is about 28 Volts. The value of the resistor 146 (R3) is about 140K Ohm. The value of the resistor 136 (R1) is about 470 Ohm at ½ watt. The value of the resistor 156 (R5) is about 1 ohm. The value of the resistor 104 (R2) is about 1M Ohm. The value of parasitic capacitor 114 (C2) is about at 0.022 microfarad. The diode 106 (D1) provides a reverse polarity protection by clamping any negative voltage spike to approximately −0.7 Volts.

The R1 resistor 136 is connected in series with the collector c of the transistor 132. The resistor R5 resistor 156 is connected in series between the base b of the transistor 132 and a terminal (NO) of the switch 110. The C2 capacitor 114, the R1 resistor 136, and D1 diode 106, are connected in parallel between the base b of the transistor 132 and return voltage 119 (e.g., ground). The R3 resistor 146 is connected between: (1) a first terminal of the R1 resistor 136 (and resistor Rsense), and a (2) first terminal of the R5 resistor 156 (and to the switch 110).

The function of the current gain at the transistor 132 of the snubber circuit 102 (e.g., on the order of about 100 or higher), is to reduce the apparent contact resistance of the switch 110 by that gain factor. As such, in one example, leveraging the current gain at the transistor 132, the contact impedance of the switch 110 can be made to be, e.g., about 100 times lower than the actual impedance of the switch 110. Another function of the selection of the gain of the transistor 132, is that the bias circuitry for the sensing circuit and the filtering by the circuit capacitor C2 reduces the arc energy, duration, peak voltage and current at the switch 110. This reduction either eliminates the contact impedance increase, or increases the switch lifetime due to contact resistance increase, or capping or limiting the maximum contact impedance increase.

Further, in one embodiment the snubber circuit 102 essentially isolates the switch 110 from voltage and/or current signals through the external Rsense resistor 116 that may cause arcing in the switch, when the switch 110 transitions between open and closes states (positions). In one configuration, by the snubber circuit 102 functions using the R3 resistor 146 having a high resistive value, as a current limiter. This reduces the effects of arcing in the switch 110. The R3 resistor 146 limits the current that flows to the switch 110 through the snubber circuit 102, thereby diminishing or decreasing the arcing which may otherwise occur.

In one embodiment, the disclosed snubber circuit separates the impedance of the switch 110 (e.g., microswitch) through the transistor 132 from the sensed resistor 136. To an external system, this reduces the effects of increased impedance of the switch contacts due to galling, contact wear, fretting and arcing on the mechanical microswitch 110. The microswitch 110 voltage and current load are reduced using the snubber circuit 102, essentially eliminating arcing effects and prolonging actual life of the microswitch 110.

In one embodiment, the disclosed snubber circuit 102 operates with no additional power, and the usable life of the microswitch 110 is extended. False failures due to high impedance or contact bounce are reduced. The microswitch 110 impedance characteristics can be predicted for the entire life of the operation of the micro-switch 110.

The snubber circuit 102 may be employed in a variety of switch (e.g., microswitch) applications where wear, galling, fretting, arc damage or increasing contact impedance are issues. An example application described herein is microswitch 110 impedance sensing.

As such, according to one embodiment disclosed herein, a system comprises a snubber circuit is configured as an electrical energy limiting circuit to reduce electrical arcing in a switch during the transition between the closed state and the open state of the switch. In one embodiment the switch may comprise the switch 110 which includes two or more contacts 122, 123, wherein the switch 110 is configured to transition between an open state of the contacts and a closed state of the contacts, wherein in the closed state the switch conducts electrical signals through the contacts, and in the open the state the switch does not conduct electrical signal through the switch.

In one embodiment, the electrical energy limiting circuit comprises a snubber circuit 102 configured to limit the maximum level of electrical signal to at least one contact of the switch to reduce said electrical arcing. In one embodiment, the snubber circuit 102 is configured to limit a maximum voltage signal to at least one contact of the switch 110. In one embodiment, the snubber circuit 102 comprises a clamping circuit including elements (e.g., diode elements 106, 107 in FIG. 1B), to clamp voltage spikes to the electrical switch. In one embodiment the snubber circuit 102 comprises an attenuation circuit (e.g., including resistor and capacitor elements 104, 108 in FIG. 1B) configured to limit electrical current to the electrical switch. In one embodiment the snubber circuit 102 comprises a gain circuit (e.g., including transistor element 132 in FIG. 1C) configured to limit the electrical signal to the switch. In one embodiment, wherein the snubber circuit 102 comprises a gain circuit (e.g., including transistor element 132 in FIG. 1C) configured to maintain a switch impedance that mitigates effects of switch contact degradation to external circuits.

Figure 1D:
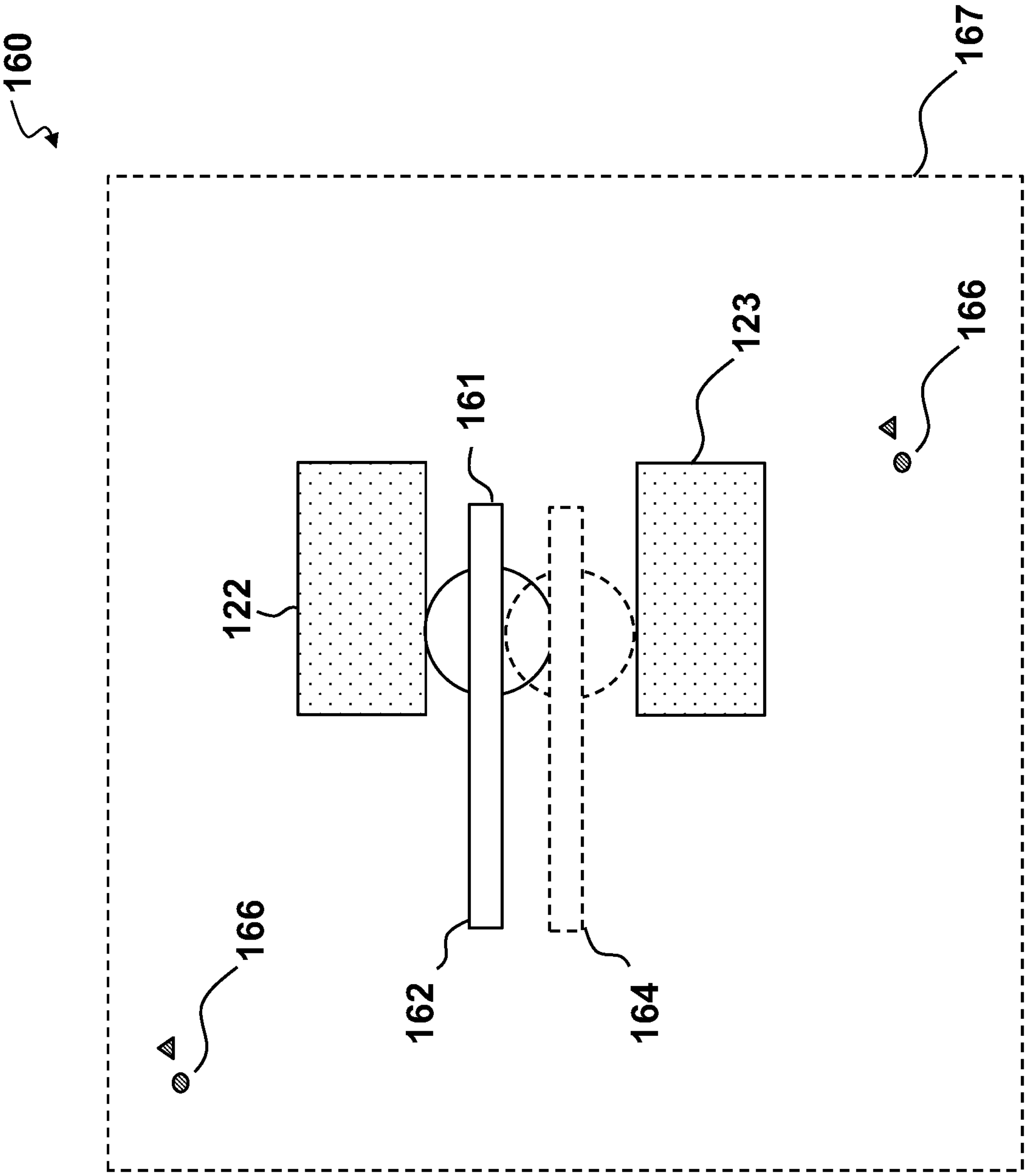
FIG. 1D depicts a mechanical switch environment, according to one embodiment.

FIG. 1D depicts a mechanical switch 160 as an embodiment of the switch 110. In this embodiment, the mechanical switch 160, which can be connected to the disclosed snubber circuit 102 (not shown) includes switch contacts 122 and 123 where the switch 160 further includes a rotatable member 161 depicted in two positions, open position 162, and closed position 164. The switch atmosphere 167 is shown as including particulates 166 surrounding the switch 160. The rotatable members may be operated by mechanical forces such as fluid pressure being sensed.

In one example, during operation of the switch 160, current passes through a contact such as contact 122 and is transferred to contact 123 through rotatable member 161 when the rotatable member 161 is in a closed position 164. While in the open position 162 an open condition is created preventing a current from passing from contact 122 to contact 123.

In one embodiment, snubber circuit 102 (not shown in FIG. 1D) provides an isolation of the switch 160 by controlling a voltage provided to the switch. A voltage threshold value which causes a high energy discharge across an opening switch contact (e.g., between rotatable member 161 and contact 123) is used to limit the chemical breakdown of atmospheric contaminants in particulates 166. The snubber circuit 102, which senses the contact closure or a rotatable member 161 in a closed position 164, decreases the contact impedance increase by the gain of a transistor, such as transistor 132 of FIG. 1C. In some embodiments, an isolation circuit is based on the transistor 132 in the snubber circuit 102, which separates a main voltage in switching from a sensed impedance through the transistor.

Figure 1E:
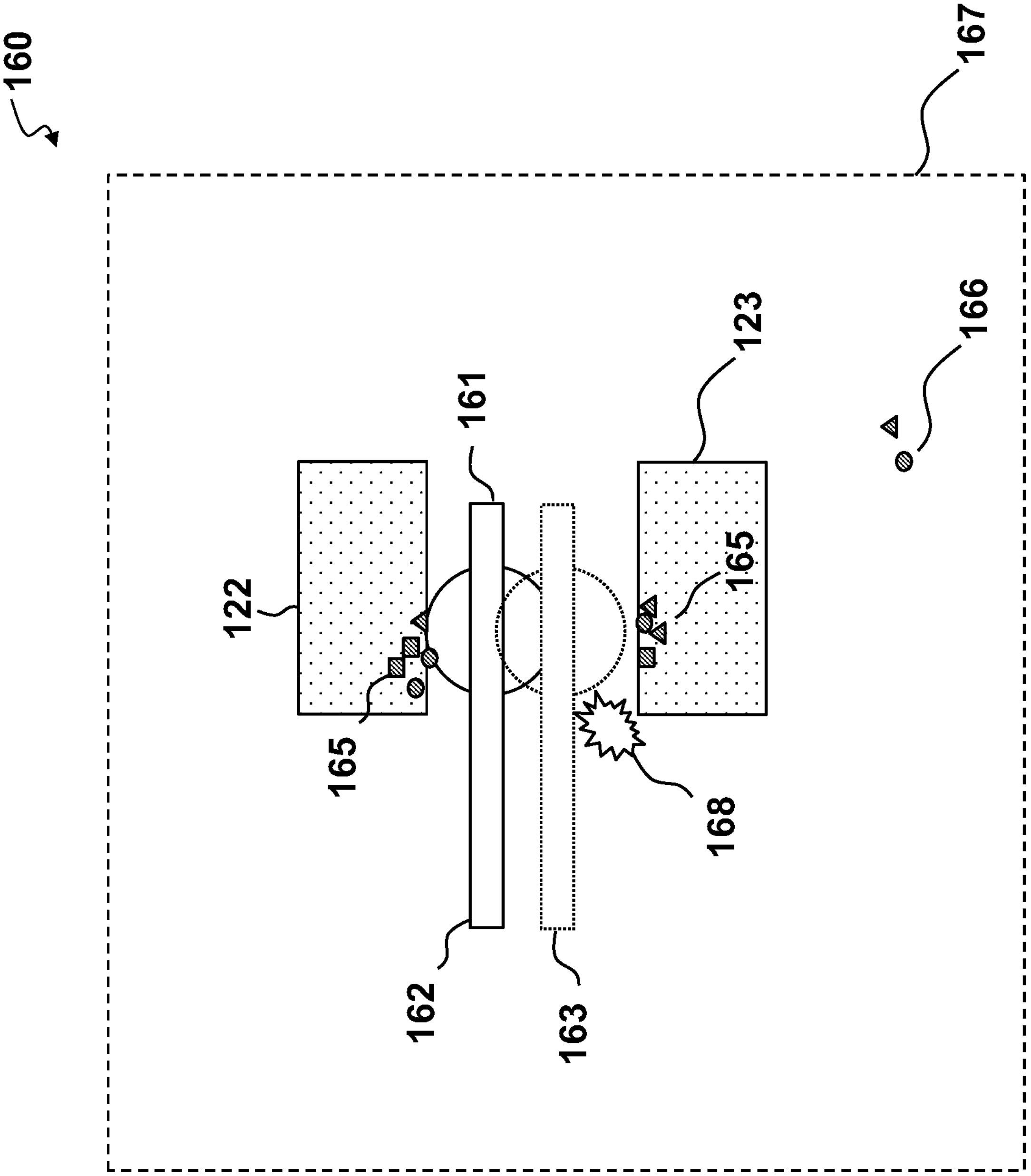
FIG. 1E depicts a mechanical switch environment affected by arcing, according to one embodiment.

Referring to FIG. 1E, in another example the switch 160 state changes to an open position 162, from a closed position 16 and the current flow is interrupted. The current which typically has inductance through the wiring (e.g., a parasitic element), may cause the current flow to go to about zero, and may cause the voltage to increase to a high value (possibly hundreds or thousands of volts). During a situation such as this, the high voltage value may cause an induced current to cross or traverse an air gap created by contacts of a switch. The flow of current across an air gap is (arcing) 168 in atmosphere 167. The snubber circuit 102 disclosed herein prevents such arcing, according to one embodiment.

The arcing 168 in atmosphere 167 typically occurs during the movement of switch contacts 122, 123, rotatable member 161 rotating away from the closed position 164. Several variations on contacts 122, 123 of the switch 110 are further shown in FIGS. 5, 6, and 7. Opening the switch 160 affected by arcing 168 in atmosphere 167, contacts 122, 123 by rotatable member 161 while a current was flowing interrupts the flow of current through the wiring inductance and resistance. This instantaneous or fast turn-off causes the voltage generated by the collapsing field of stored magnetic energy to create a fast-rising transient through the inductance. Depending on the rate of collapse of this field in the inductor, the voltage can rise quickly and to very high voltages. The rate of change of the voltage spike depends on the inductance of the wiring and the speed of the open contact interruption of the current. During the time the voltage builds up, the mechanical switch affected by arcing 168 in atmosphere 167, and the contacts 122, 123 may move from the closed position 164 before sufficient voltage is generated to break down the atmosphere 167 surrounding the contacts 122, 123. At some point during the switch 160 opening to a position 162 and the contacts 122, 123 rotatable member 161 moving from the closed position 164 to fully open position 162, the voltage may become high enough to arc across the open contact area represented by position 163. The snubber circuit 102 disclosed herein prevents such arcing, according to one embodiment.

At the point where the arc occurs, for example at points 165, any organic trace elements in particulates 166 held within the atmosphere may be broken down to carbon, oxygen, hydrogen, or other elements and form a new insulating compound that deposits around the arcing 168 in atmosphere 167 and contact points of contacts 122, 123 and surfaces of rotatable member 161. The chemical process is burning by igniting an organic material in oxygen or air but may also be a heat induced chemical breakdown and/or electrical induced breakdown. The predominant insulating element remaining is carbon, oxygen, hydrogen, or other trace elements in particulates 166 typically will not permanently adhere to the surface. A secondary effect of eliminating the arc using the snubber circuit disclosed herein, is to eliminate micro welded surface roughness. Surface roughness can allow increased mechanical adhesion for the carbon deposition. In one embodiment, the circuit 130 in FIG. 1C which includes a transistor to sense the contact closure, can decrease the contact impedance increase by the gain of the transistor. In another embodiment, the selection of the transistor gain, bias circuitry for the sensing circuit and the filtering by circuit capacitance can reduce the arc energy, duration, peak voltage, and current. This reduction provides elimination of the contact impedance increase, increased lifetime to failure due to contact resistance increase, or capping or limiting the maximum contact impedance increase.

Figure 2:
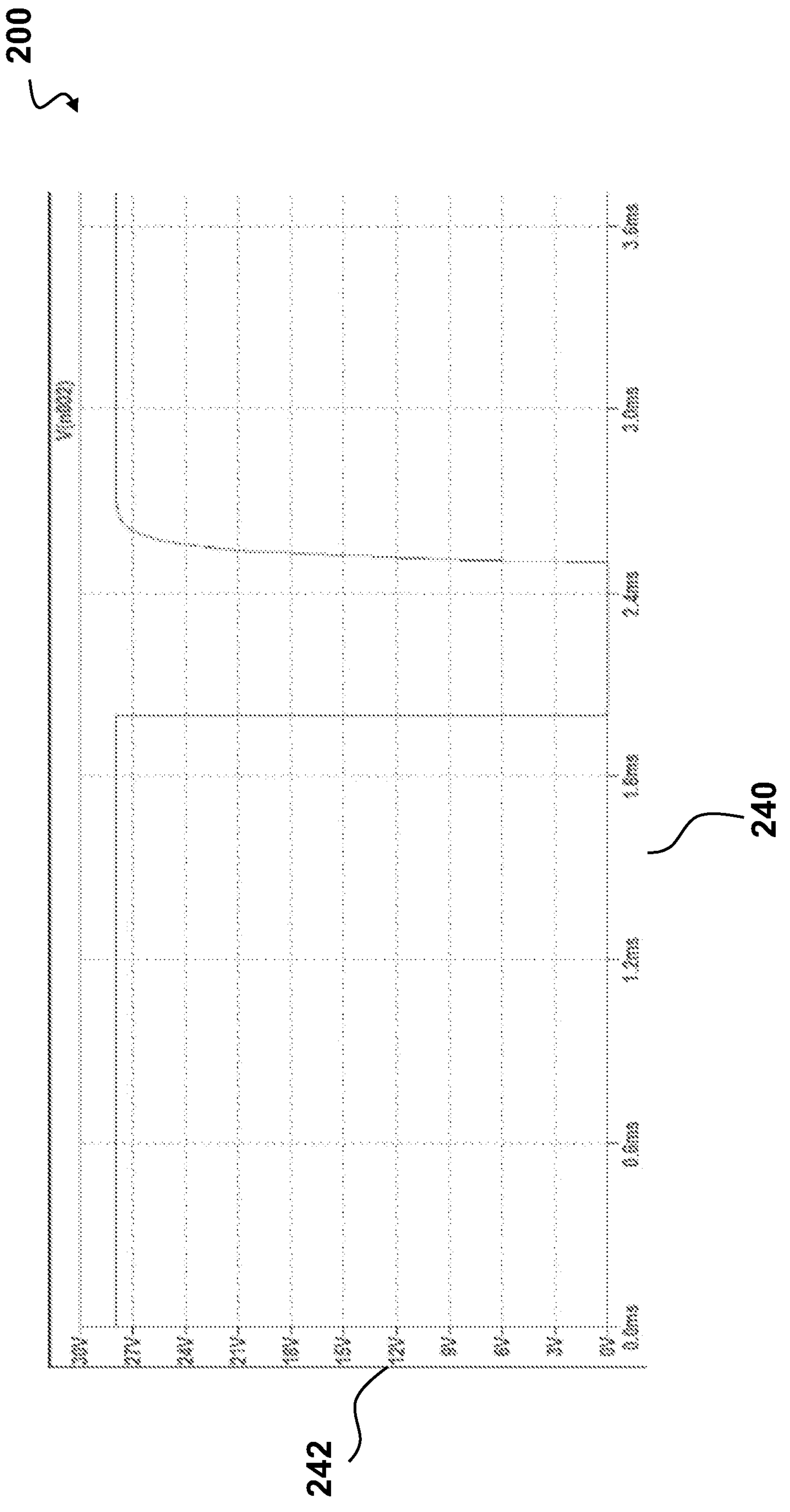
FIG. 2 depicts a voltage diagram of the snubber circuit operating in systems of FIGS. 1A-1B, according to one embodiment.

Referring to FIG. 2 in conjunction to FIG. 1C, the example graph 200 shows the voltage signal measured across the circuit 130. In this example, an x-axis 240 shows units of time in milliseconds (ms) and a y-axis 242 shows the voltage measured across the snubber circuit 102, FIG. 1B) in volts (V). There is a slow ramp up of the voltage after approximately 2.5 ms from a closed state (0V) to an open state (about 28 Volts). As s function of the snubber circuit 102, the voltage does not increase far enough or fast enough to bridge the gap of the moving switch contacts, thereby preventing arcing between switch contacts.

Figure 3:
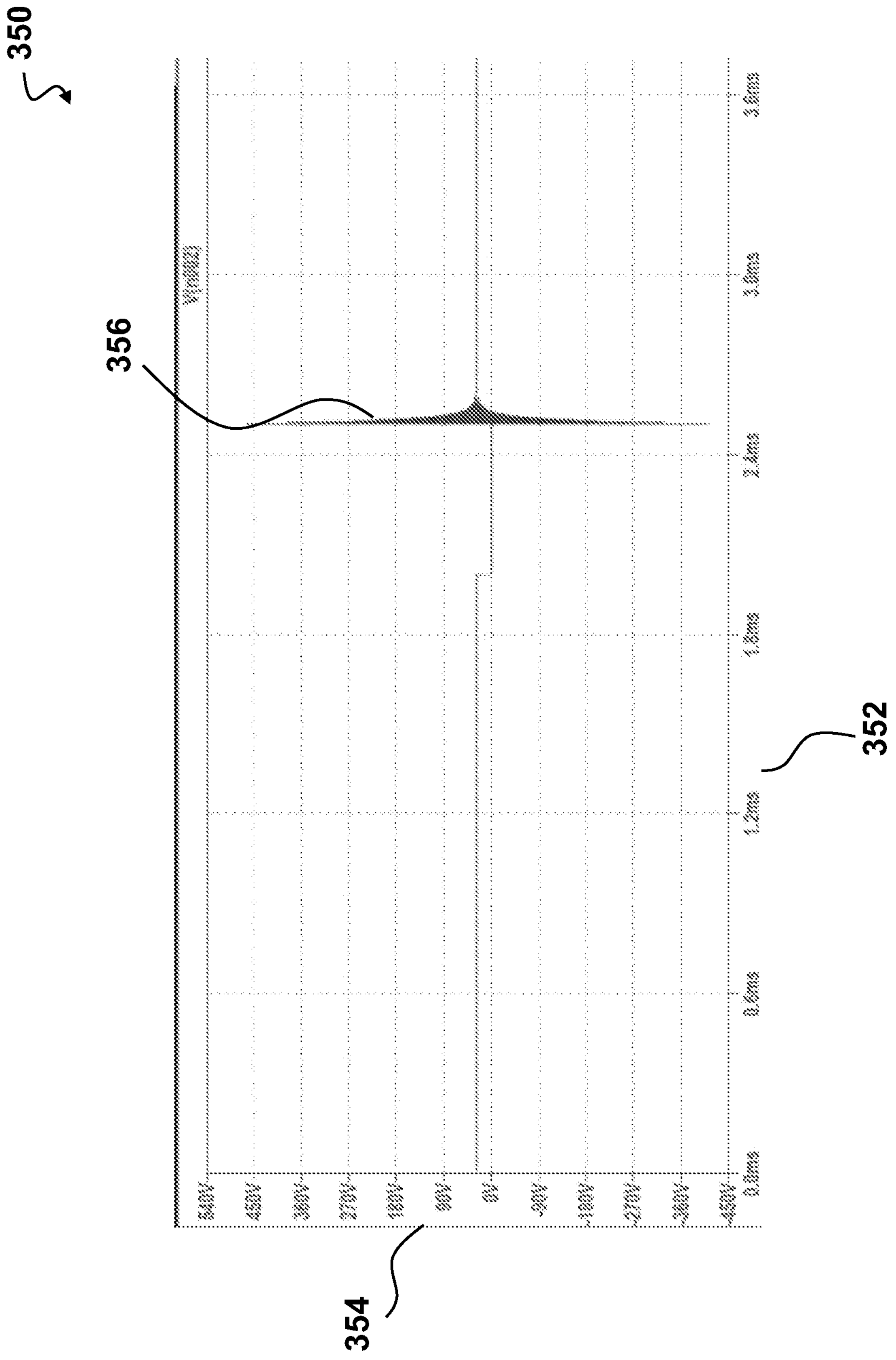
FIG. 3 depicts a response diagram of the snubber circuit operating in systems of FIGS. 1A-1B, according to one embodiment.

With respect to FIG. 3, the example graph 350 shows the electrical signal response of the switch 110 without the snubber circuit 102 in operation, such in the system 101 of FIG. 1. In this example, an x-axis 352 shows units of time in milliseconds (ms) and a y-axis 354 shows the voltage measured across the switch 110 in Volts (V). A ringing feature 356 is present and there is fast ramp-up of voltage exhibited, which is sufficient in voltage and rate to induce arcing as the contacts 122 and 123 of the switch 110, separate to open position. Without the disclosed snubber circuit, as shown in the example in FIG. 3, there is no mitigation of the ream-up voltage which bridges the gap between the moving contacts and causes arcing.

During the transition between closed and open position in the switch 110, the transient voltage created by the stored energy in the parasitic inductance and parasitic capacitance may increase and ring. The peak voltage in the circuit 100 may reach several hundred volts. In one example, the voltage may reach about 450 volts. FIG. 3 shows a model of electrical ringing fairly typical in applications with wires or harnesses several feet in length. With the integration of the snubber circuit 102, as shown in FIG. 2, the voltages remain near zero in the closed position and do not overshoot the power supply 118. Additionally, there is no discernable arc voltage produced that is capable of bridging the contact gap and causing deposition of outgas material.

Figure 4A:
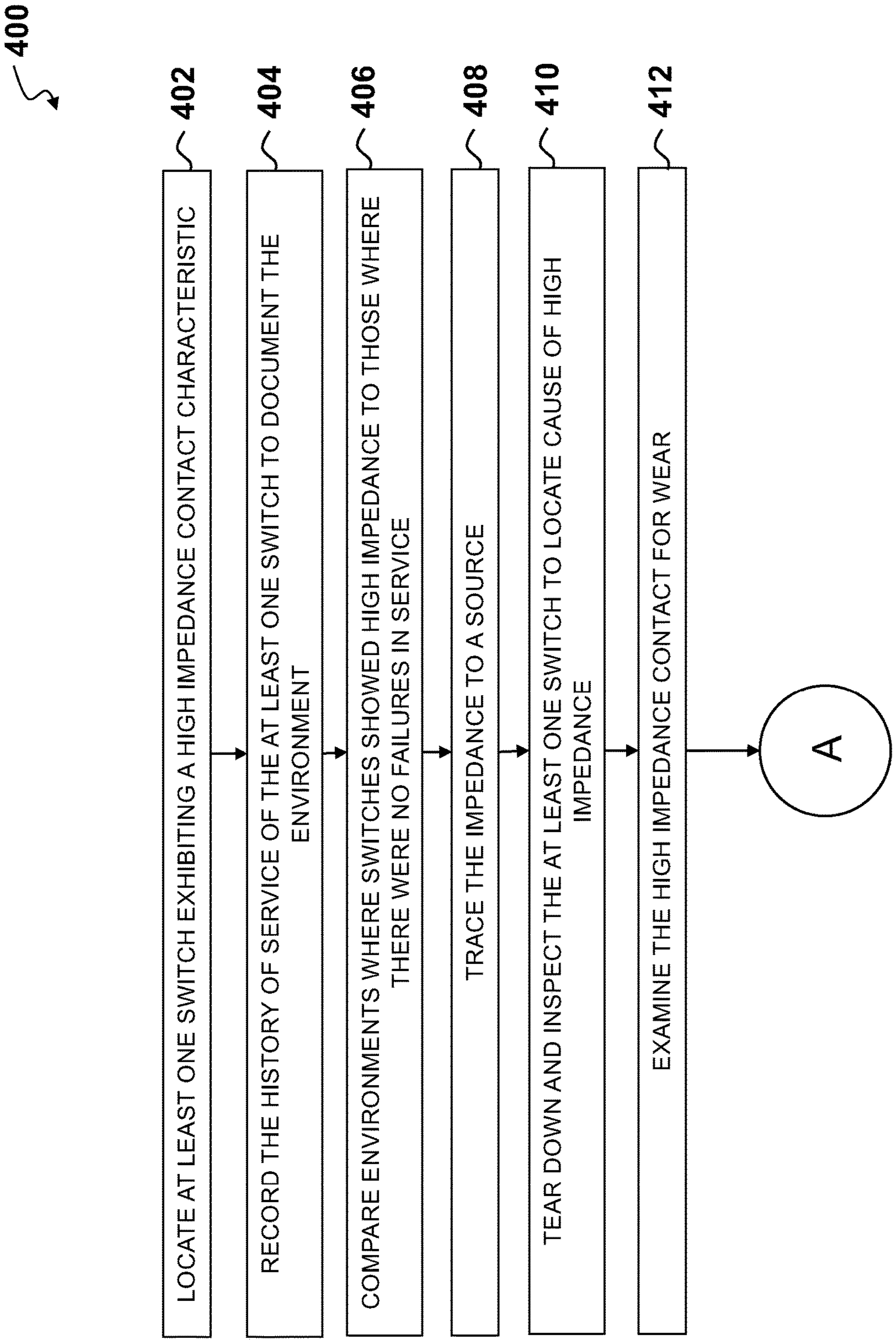
FIGS. 4A-4B depict a flow chart of a method for determining contact resistance problems in a switch, according to one embodiment.
Figure 4B:
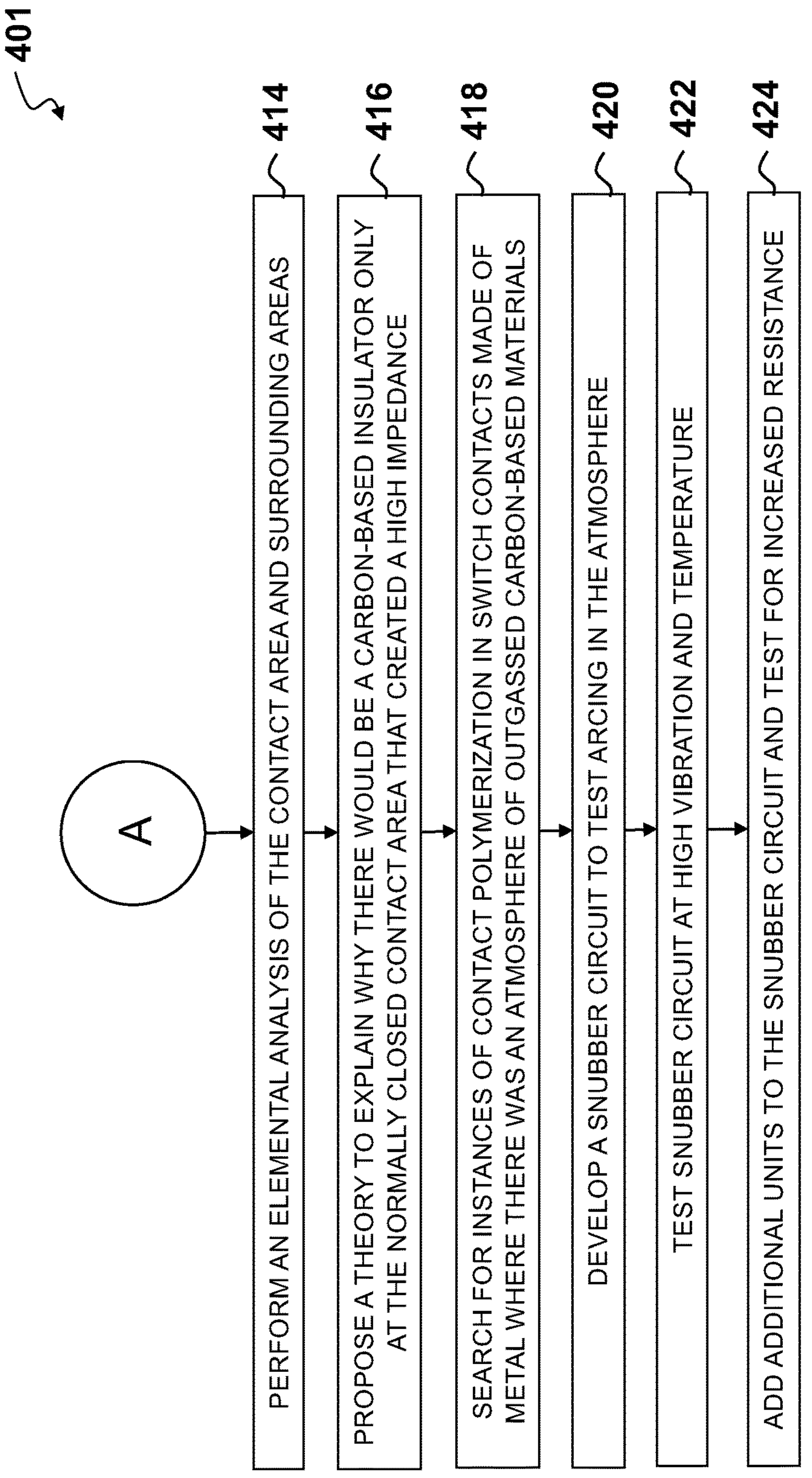

With respect to FIGS. 4A-4B, a flow chart of a method 400, 401 for reducing and/or eliminating contact resistance issues in a switch or microswitch is shown, according to an embodiment disclosed herein. The method 400, 401 of FIGS. 4A-4B shows an analysis process used to characterize the unknown cause that leads to determining how to eliminate the high impedance condition. In example for a microswitch with gold cap contacts, some embodiments provide a limit of arcing to reduce micro-welding which alters the switch contact area and may add to contact impedance or uncovering underlying metal such as nickel under gold flash. The disclosed method 400, 401 for determining the design parameters for the snubber circuit 102 in one embodiment provides a process for eliminating the high contact impedance. High voltage spikes on an opening of a switch causes arcing sufficient to chemically break down atmospheric contaminants. These contaminants are deposited on the switch contacts, typically as carbon resulting in increased contact resistance. The method 400 includes the following steps. At least one switch is located which exhibits a high impedance contact characteristic (step 402). The history of service of the switch may be recorded to document the environment (step 404). Environments where the switch showed high impedance may be compared to those where there were no failures in service (step 406). The impedance may be traced to a source (step 408). Tracing of the impedance may rule out connector or interconnect as the cause of contact resistance issues, internal wire connections and solder joints, as well as all elements other than the switch itself.

In one embodiment, commonality among switches that exhibit the high impedance occur at temperatures over 70 degrees Celsius in high vibration conditions. The switch may be torn down and inspected to locate the cause of high impedance (step 410). Many types of switches may exhibit the effects described. One type includes switches that have integral cantilevered springs that provide a two-state contact condition as in Single Pole Double Throw (SPDT) switches. These switches have one contact normally closed, a lower contact with a contact in a center piece, and one contact on each side of the conductive cantilever. The second contact (top of cantilever and a second top contact) is normally open. Experimental results showed the increased impedance of the closed contact. The normally open contact did not show high impedance. The high impedance contact may be examined for wear, such as exposed base metal under gold (step 412). In one embodiment, the metal may be nickel over beryllium copper. Referring to FIG. 4B, a connection between the method 400, 401 in FIGS. 4A and 4B is shown with reference to character A.

In one embodiment, an elemental analysis may be performed on the contact area and surrounding areas (step 414). If the high impedance contact area shows a carbon-based layer of insulator, and the surrounding areas of the switch and the normally open contact show no discernable contaminant, then there may be no migration of contaminant, gold wear, oxidation of base metal. Therefore, these elements may be eliminated as potential causes of contact resistance.

A theory may be proposed to explain why there would be a carbon-based insulator only at the normally closed contact area that created a high impedance (step 416). The carbon-based insulator may be due to either mechanical motion induced by the vibration or electrically induced arcing caused by material in the atmosphere surrounding the switch to deposit at the normally closed contact.

A search may be performed to find reports of contact polymerization in switch contacts made of metals such as Palladium, Rhodium and Platinum where there exists an atmosphere of outgassed carbon-based materials (step 418). In one embodiment, gold has been found to not show this effect. In order to test the theory of arcing in an atmosphere, an electronic snubber circuit, such as snubber circuit 102 disclosed herein is employed to limit maximum arcing voltage to, for example, 0.25V, which is below a reported 0.5 activation voltage for causing chemical reactions (step 420). The snubber circuit 102 slows and attenuate the arc through the limitation of current through the resistor, slows the response by the RC time constant, and clamps the voltage and sets the direction through the Schottky diodes (e.g., resistor 104, capacitor 108, and diodes 106, 107 in FIG. 1B).

Tests may be performed with switches of similar configurations as the switches that exhibit increasing contact resistance with time (step 422). In one embodiment, the tests may include switches powered as in the failed configuration with high vibration. In one embodiment, the circuits may be run at elevated temperatures, such as 135 degrees C., and room temperature.

Circuits with the snubber circuit 102 may be added and run under the same conditions (step 424). In one embodiment, using a snubber circuit disclosed herein, no resistance increase is found in such circuits, even for five times longer than RC period. This threshold may vary for different types of organic atmospheres, concentrations, and/or temperatures. All that is needed for impedance increase in switch contacts, is an arc of sufficient energy produced by routine opening and closing of the switch. Being close to a threshold may not matter as long as it goes from no arc-to-arc discharge. Only the arc discharge causes sufficient energy to activate the action. The arc only occurs on opening or in contact bounce.

Figure 5:
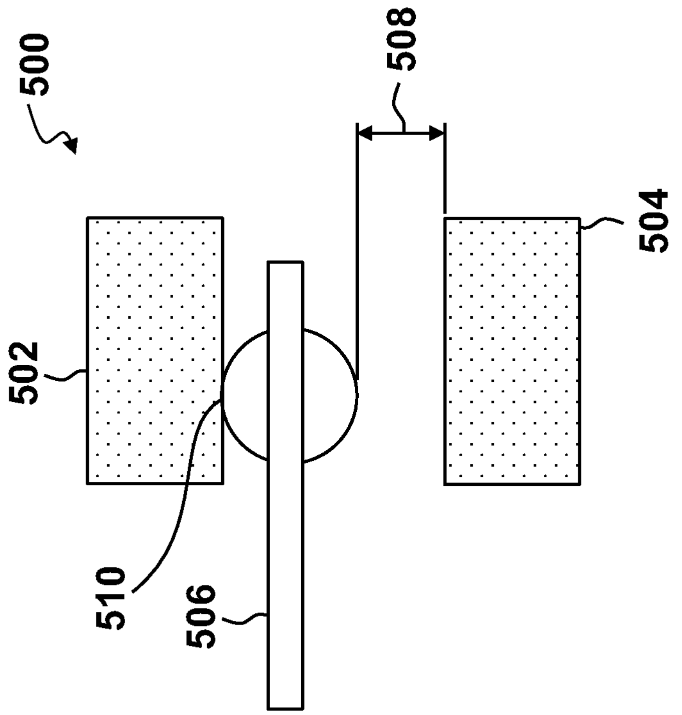
FIG. 5 depicts a partial cut-away view of contacts of a microswitch in a system, according to one embodiment.
Figure 6:
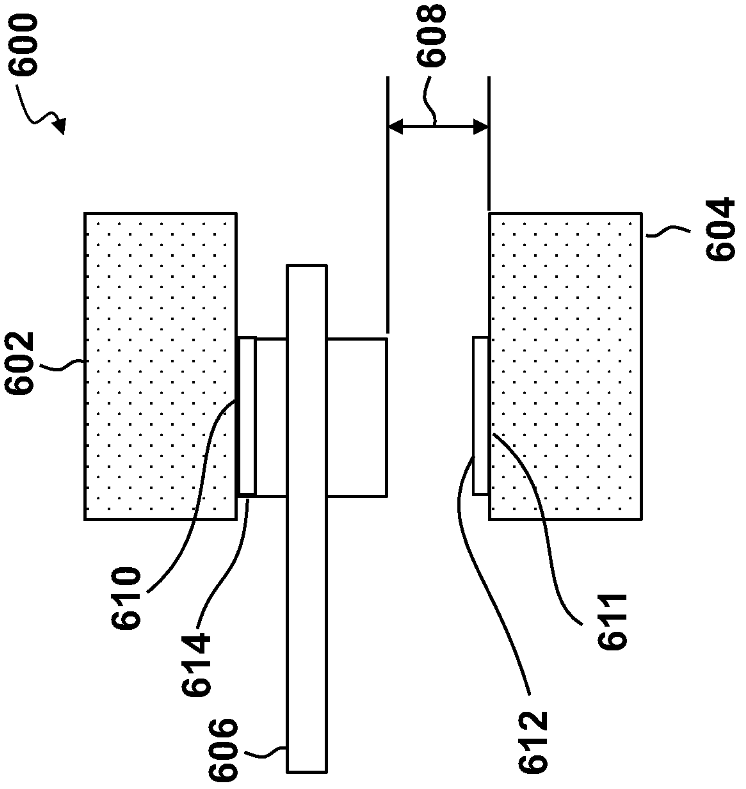
FIG. 6 depicts a partial cut-away view of an actual deposition and insulating layer at an arc point of alternate contacts of a microswitch in a system, according to one embodiment.
Figure 7:
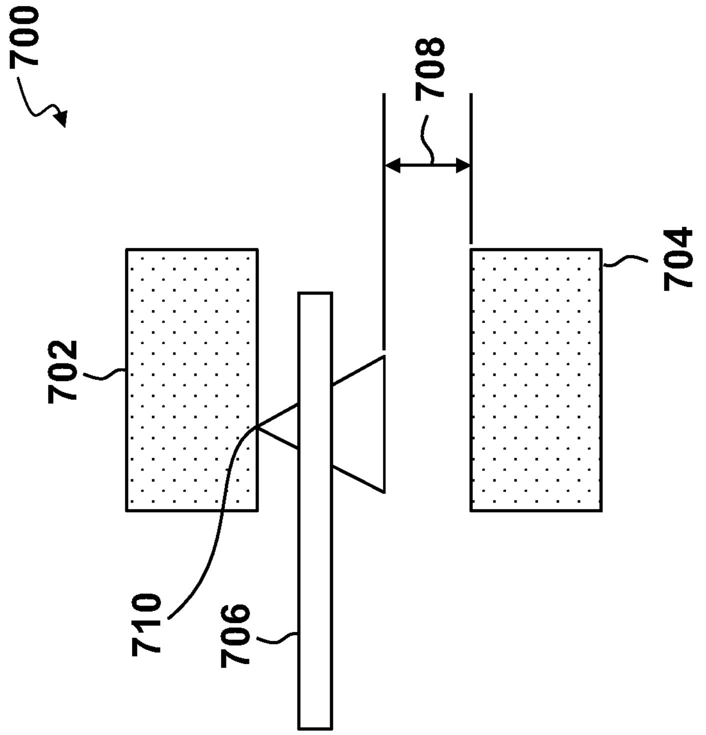
FIG. 7 depicts a partial cut-away view of alternate contacts of a microswitch in a system, according to one embodiment.

FIGS. 5, 6, and 7 depict various contacts for a microswitch. Opening the switch contacts while a current is flowing interrupts the flow of current through the wiring inductance and resistance. This instantaneous or fast turn off causes the voltage generated by the collapsing field of stored magnetic energy to create a fast-rising transient through the inductance. Depending on the rate of collapse of this field in the inductor, the voltage can rise quickly and to very high voltages. The rate of change of the voltage spike depends on the inductance of the wiring and the speed of the open contact interruption of the current. During the time the voltage builds up, the mechanical switch contacts may move from the closed position before sufficient voltage is generated to break down the atmosphere surrounding the contacts. At some point during the switch opening and the contacts moving from the closed to fully open position, the voltage may become high enough to arc across the open contact area.

FIG. 5 depicts a cross-sectional view of contacts in a microswitch 500. The contacts include a normally closed (NC) contact 502, a normally open (NO) contact 504, and a moveable contact 506. A contact gap 508 is present between the moveable contact 506 and the NO contact 504. The moveable contact 506 may rotate to bridge the contact gap 508 so that the moveable contact 506 transitions from having no contact with NO contact 504 to closing a circuit and contacting NO contact 504. Contaminants may form at a point of contaminant 510 where the moveable contact 506 contacts the NC contact 502 and/or a point of contact where the moveable contact 506 bridges the contact gap 508 making contact with NO contact 504 (not shown). The moveable contact 506 is depicted as having a circular cross section. Other cross section sizes and shapes for the moveable contact 506 are possible and contemplated.

FIG. 6 depicts a cross-sectional view of deposition and insulating layer at an arc point of alternate contacts in a microswitch 600 embodiment. FIG. 6 is an example of arc induced layer of insulation causing high impedance, when a snubber circuit as disclosed herein is not utilized. The contacts include a normally closed (NC) contact 602, a normally open (NO) contact 604, and a moveable contact 606. A contact gap 608 is present between the moveable contact 606 and the NO contact 604. The moveable contact 606 may move between contacting the NC contact 602 and the NO contact 604. Contaminants may form at a point of contaminant 610 where the moveable contact contacts the NC contact 602 and/or a point of contact where the moveable contact 606 bridges the contact gap 608 making contact with the NO contact 604 (not shown). The moveable contact 606 is depicted as having a rectangular cross section. Other cross section sizes and shapes for the moveable contact 606 are possible and contemplated. Also illustrated is point of contaminant 611, which is adjacent to NO contact 604. A formed or induced insulation layer 612, 614 from an arc discharge caused by a high impedance is illustrated adjacent to the point of contaminant 610 and point of contaminant 611. An arc event can cause a layer of material to form a 0.01 mil thick layer over both sides of the contact which is distributed fairly uniformly rather than "normally".

FIG. 7 depicts a cross-sectional view of alternate contacts in a microswitch 700. The contacts include a normally closed (NC) contact 702, a normally open (NO) contact 704, and a moveable contact 706. A contact gap 708 is present between the moveable contact 706 and the NO contact 704. The moveable contact 706 may move between contacting the NC contact 702 and the NO contact 704. Contaminants may form at a point of contaminant 710 where the movable contact contacts the NC contact 702 and/or a point of contact where moveable contact 706 bridges the contact gap 708 making contact with the NO contact 704 (not shown). The moveable contact 706 is depicted as asymmetrical and having a triangular cross section. Other cross section sizes and shapes for the moveable contact 706 are possible and contemplated.

In another embodiment, a switch design may employ bifurcated contacts or dual contacts to decrease contact resistance of the switch 110 and allow extended life in case of weld issues or physical blockage or wear of gold exposing underlying nickel. In this embodiment, there can be a sacrificial contact with closer spacing that arcs first, protecting a second further spaced contact, thus reducing arcing. Both contacts are protected by a snubber circuit disclosed herein, while the first contact can make the snubber voltage limiting and less demanding. As such, in one example the switch 110 may comprise bifurcated contacts or dual contacts, where one of the contacts is designated as a sacrificial first contact with a closer spacing that causes a first arc event to occur before a second arc event at a second contact, thus protecting the further spaced second contact, and thus reducing arcing for the second contact.

In another embodiment, a method comprises transitioning the switch 110 between an open position and a closed position, wherein the switch 110 comprises two or more contacts (e.g., contacts 122, 123, 502, 504, 506, 602, 604, 606, 702, 704, 706); and dissipating stored energy via a snubber circuit 102 in communication with the switch 110. The snubber circuit 102 is configured to eliminate arcing during the transition between the closed state and the open state by limiting voltage that prevents arcing sufficient to trigger a chemical breakdown of a surrounding atmosphere on at least one of the two or more contacts. Additionally, the dissipating of the stored energy further comprises one or more of: limiting voltage signal transients and limiting current signal transients. Moreover, a maximum voltage allowed by the snubber circuit 102 may be determined by at least one of chemical analysis, testing and atmospheric variations as disclosed herein.

It is contemplated that various combinations and/or sub-combinations of the specific features and aspects of the above embodiments may be made and still fall within the scope of the invention. Accordingly, it should be understood that various features and aspects of the disclosed embodiments may be combined with or substituted for one another in order to form varying modes of the disclosed invention. Further, it is intended that the scope of the present invention herein disclosed by way of examples should not be limited by the particular disclosed embodiments described above.

What is claimed is:

1. A system, comprising:

a switch comprising two or more contacts, wherein the switch is configured to transition between an open state and a closed state; and a circuit comprising a snubber circuit in communication with the switch, wherein the snubber circuit is configured as an energy limiting isolator circuit to reduce arcing during the switch transition between the closed state and the open state by limiting voltage, to prevent arcing that triggers a chemical breakdown of a surrounding atmosphere on at least one of the two or more switch contacts to eliminate increased contact resistance;

wherein the snubber circuit comprises:

an impedance module, and a reactive energy storage module in electrical communication with the impedance module, configured to provide a steady voltage source;

a rectifier module in electrical communication with the steady state voltage source, configured to control voltage relative to a threshold voltage; and a voltage clamping module in electrical communication with the steady voltage source, configured to control ringing signals.

2. The system of claim 1, wherein the snubber circuit is further configured to reduce arcing event occurrences, reduce contained arcing energy, and reduce a duration of an arc event.

3. The system of claim 1, wherein the snubber circuit is configured to reduce arcing that causes the chemical breakdown of the surrounding atmosphere on the at least one of the two or more contacts that causes a deposition of contaminants on the at least one of the two or more contacts of the switch, which increases contact electrical resistance.

4. The system of claim 1, wherein the snubber circuit electrically isolates the switch to maintain a voltage buildup below a threshold, which prevents a high energy discharge across at least one of the two or more switch contacts, wherein the high energy discharge causes the surrounding atmosphere to form contaminants on a surface of at least one of the two or more contacts.

5. The system of claim 1, wherein the snubber circuit is configured to reduce mechanical adhesion properties of a switch contact surface of the two or more contacts through a secondary effect of reducing micro-arc welding surface roughness.

6. The system of claim 1, further comprising:

a sense resistor in electrical communication with the snubber circuit;

a parasitic element in electrical communication with the sense resistor, wherein the parasitic element simulates a parasitic inductance and a parasitic capacitance; and a power supply in electrical communication with the parasitic element.

7. The system of claim 1, wherein the switch comprises bifurcated contacts, wherein one of the bifurcated contacts is configured as a sacrificial first contact with a closer spacing to the switch that causes a first arc event to occur before a second arc event at a second contact, thus protecting the further spaced second contact, and thus reducing arcing for the second contact.

8. The system of claim 7, wherein the bifurcated contacts decrease contact resistance of the switch and allow one or more of the following: extended life in case of welding issues, and physical blockage and wear of gold exposing underlying nickel.

9. The system of claim 1, wherein the snubber circuit comprises a transistor circuit that limits an electrical signal to the at least one of the two or more contacts while maintaining an impedance that mitigates effects of an arc event in the switch.

10. The system of claim 1, wherein the snubber circuit comprises a transistor isolation circuit that separates a main voltage in switching from a sensed impedance through the transistor during switch operation.

11. The system of claim 1, wherein the snubber circuit includes an electronic switch-off circuit comprising a transistor with a gain greater than about 100 Ohms, an Off impedance about 10 times greater than an On condition of the transistor, and a low On resistance in a range of about 10 to 500 Ohms.

12. The system of claim 1, wherein the snubber circuit comprises a gain circuit including a transistor and a bias circuitry for a sensing circuit and filtering by circuit capacitance, wherein the snubber circuit reduces one or more of: arc energy, arc event duration and peak voltage, and current in the switch.

13. The system of claim 12, wherein the snubber circuit is configured via the transistor to sense a switch contact closure, and to decrease a switch contact impedance increase based on the gain of the transistor.

14. The system of claim 1, wherein an arc discharge creates an insulation layer that increases impedance on at least one of the two or more contacts.

15. A system, comprising:

a snubber circuit configured as an electrical energy limiting circuit for electrical connection with an electrical switch, wherein the snubber circuit is configured to reduce electrical arcing in the switch during a transition between a closed state and an open state of the contacts;

wherein the snubber circuit comprises:

an impedance module, and a reactive energy storage module in electrical communication with the impedance module, configured to provide a steady voltage source;

a rectifier module in electrical communication with the steady state voltage source, configured to control voltage relative to a threshold voltage; and a voltage clamping module in electrical communication with the steady voltage source, configured to control ringing signals.

16. The system of claim 15, wherein the snubber circuit is configured to limit a maximum voltage signal to at least one contact of the switch.

17. The system of claim 15, wherein the snubber circuit comprises a clamping circuit to clamp volage spikes to the electrical switch.

18. The system of claim 15, wherein the snubber circuit comprises an attenuation circuit configured to limit electrical current to the electrical switch.

19. The system of claim 15, wherein the snubber circuit comprises a gain circuit configured to limit an electrical signal to the switch.

20. The system of claim 15, wherein the snubber circuit comprises a gain circuit configured to maintain a switch impedance that mitigates effects of switch contact degradation to external circuits.

21. The system of claim 15, further comprising the switch in electrical communication with the snubber circuit, wherein the switch comprises two or more contacts configured to transition between an open state of the contacts and a closed state of the contacts, wherein in the closed state the switch conducts electrical signals through the contacts.

22. A method comprising:

limiting arc energy, arc event occurrences, and arc event duration in a snubber circuit system comprising a switch via a snubber circuit in communication with the switch, wherein the snubber circuit is configured to electrically isolate the switch and prevent at least one of:

a chemical breakdown with a burning that causes contact impedance increases due to organic atmospheres;

an arc induced burning of contaminants in atmospheres surrounding the switch, which deposit contaminants on at least one of two or more contacts of switch; and a reduction of a duration of the chemical breakdown of the atmosphere surrounding the switch;

wherein the snubber circuit comprises:

a resistor;

a capacitor, wherein the resistor and the capacitor are connected in series;

a first diode, wherein the first diode is connected in parallel across the resistor; and a second diode, wherein the second diode is connected in parallel across the capacitor.

23. A method comprising:

transitioning a switch between an open state and a closed state, wherein the switch comprises two or more contacts; and dissipating stored energy via a snubber circuit in communication with the switch, wherein the snubber circuit is configured to eliminate arcing during the transition between the closed state and the open state by limiting voltage that prevents arcing sufficient to trigger a chemical breakdown of a surrounding atmosphere on at least one of the two or more contacts;

wherein the snubber circuit comprises:

an impedance module, and a reactive energy storage module in electrical communication with the impedance module, configured to provide a steady voltage source;

a rectifier module in electrical communication with the steady state voltage source, configured to control voltage relative to a threshold voltage; and a voltage clamping module in electrical communication with the steady voltage source, configured to control ringing signals.

24. The method of claim 23, wherein dissipating the stored energy further comprises one or more of: limiting voltage signal transients and limiting current signal transients.

25. The method of claim 23, further comprising:

determining maximum voltage allowed by the snubber by at least one of chemical analysis, testing and atmospheric variations.

* * * * *